United States Patent
O'Sullivan et al.

(10) Patent No.: US 11,544,966 B2
(45) Date of Patent: Jan. 3, 2023

(54) IMAGE ACQUISITION SYSTEM FOR OFF-AXIS EYE IMAGES

(71) Applicant: FotoNation Limited, Galway (IE)

(72) Inventors: Brian O'Sullivan, Galway (IE); Barry McCullagh, Galway (IE); Serghei Carateev, Galway (IE); Istvan Andorko, Galway (IE); Petronel Bigioi, Galway (IE)

(73) Assignee: FotoNation Limited, Galway (IE)

( * ) Notice: Subject to any disclaimer, the term of this patent is extended or adjusted under 35 U.S.C. 154(b) by 145 days.

(21) Appl. No.: 17/163,731

(22) Filed: Feb. 1, 2021

(65) Prior Publication Data

US 2021/0150181 A1 May 20, 2021

Related U.S. Application Data

(63) Continuation of application No. 16/410,559, filed on May 13, 2019, now Pat. No. 10,909,363.

(51) Int. Cl.
*G06V 40/18* (2022.01)
*G06T 19/00* (2011.01)
*H04N 5/225* (2006.01)

(52) U.S. Cl.
CPC .......... *G06V 40/193* (2022.01); *G06T 19/006* (2013.01); *H04N 5/2253* (2013.01)

(58) Field of Classification Search
CPC ... G06K 9/0061; G06T 19/006; H04N 5/2253
See application file for complete search history.

(56) References Cited

U.S. PATENT DOCUMENTS

| | | | |
|---|---|---|---|
| 2007/0025598 A1 | 2/2007 | Kobayashi et al. | |
| 2007/0036397 A1* | 2/2007 | Hamza | G06V 40/18 382/117 |
| 2009/0169064 A1 | 7/2009 | Kim et al. | |

OTHER PUBLICATIONS

A. K. Jain, A. Ross, and S. Prabhakar, "An introduction to biometric recognition," IEEE Trans. Circuits Syst. Video Technol., vol. 14, 2004.

(Continued)

*Primary Examiner* — Ruiping Li
(74) *Attorney, Agent, or Firm* — Lee & Hayes, PC

(57) ABSTRACT

An image acquisition system determines first and second sets of points defining an iris-pupil boundary and an iris-sclera boundary in an acquired image; determines respective ellipses fitting the first and second sets of points; determines a transformation to transform one of the ellipses into a circle on a corresponding plane; using the determined transformation, transforms the selected ellipse into a circle on the plane; using the determined transformation, transforms the other ellipse into a transformed ellipse on the plane; determines a plurality of ellipses on the plane for defining an iris grid, by interpolating a plurality of ellipses between the circle and the transformed ellipse; moves the determined grid ellipses onto the iris in the image using an inverse transformation of the determined transformation; and extracts an iris texture by unwrapping the iris and interpolating image pixel values at each grid point defined along each of the grid ellipses.

20 Claims, 13 Drawing Sheets

(56) References Cited

OTHER PUBLICATIONS

Richard Bonner: "An Investigation of Iris Recognition in Unconstrained Environments", Doctor of Philosophy (PhD) thesis, University of Kent, Dec. 2014.
Stephanie Schuckers, Natalia Schmid, Aditya Abhyankar, Vivekanand Dorairaj, Christopher Boyce and Lawrence Hornak "On Techniques for Angle Compensation in Nonideal Iris Recognition" IEEE Transactions on Systems, Man, and Cybernetics, Part B (Cybernetics) vol. 37(5) Oct. 2007.
Joseph Thompson, Hector Santos-Villalobos, Mahmut Karakaya, Del Barstow, David Bolme and Chris Boehnen "Off-angle iris correction using a biological model" IEEE Sixth International Conference on Bio- metrics: Theory, Applications and Systems (BTAS) Oct. 2013.
Kulkarni and Kopanar: "Elliptical Iris Detection using Morphological Operations", International Journal of Computer Science and Mobile Computing, IJCSMC, vol. 2, Issue. 4, Apr. 2013, p. 95-100.
Ryan, et al: "Adapting Starburst for Elliptical Iris Segmentation", IEEE Second International Conference on Biometrics: Theory, Applications and Systems (BTAS) Washington, D.C., Sep. 2008.
Richard Hartley and Andrew Zisserman "Multiple View Geometry in Computer Vision" 2nd edition, Cambridge University Press (2003).
Christian Hansen, Victor Pereyra, Godela Scherer "Least Squares Data Fitting with Applications" Johns Hopkins University Press (2013).
Reza Safaee-Rad, Ivo Tchoukanov, Kenneth Carless Smith, and Bensiyon Benhabib; "Three-Dimensional Location Estimation of Circular Features for Machine Vision". IEEE Transactions on Robotics and Automation, vol. 8(5) pp. 324-640 Oct. 1992.
Haiyuan Wu, Qian Chen and Toshikazu Wada; "Visual direction estimation from a monocular image". IEICE Transactions on Information and Systems, vol. E86-D(5) pp. 1-9 May 2003.
Haiyuan Wu, Qian Chen and Toshikazu Wada "Estimating the Visual Direction with Two-Circle Algorithm" Advances in Biometric Person Authentication Lecture Notes in Computer Science, vol. 3338, Springer (2004).

* cited by examiner

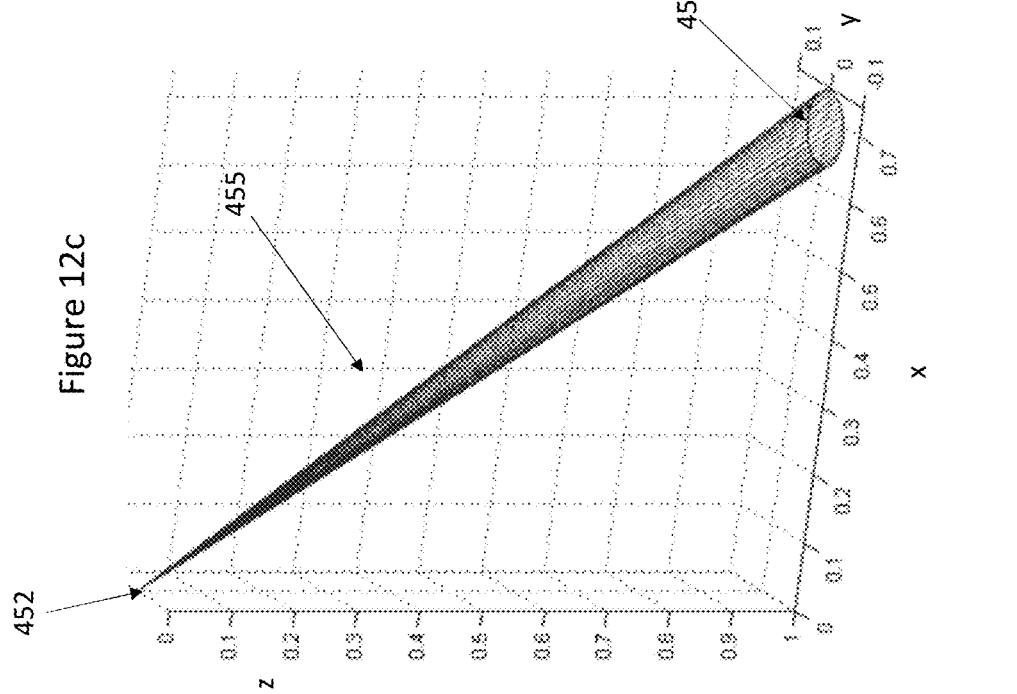
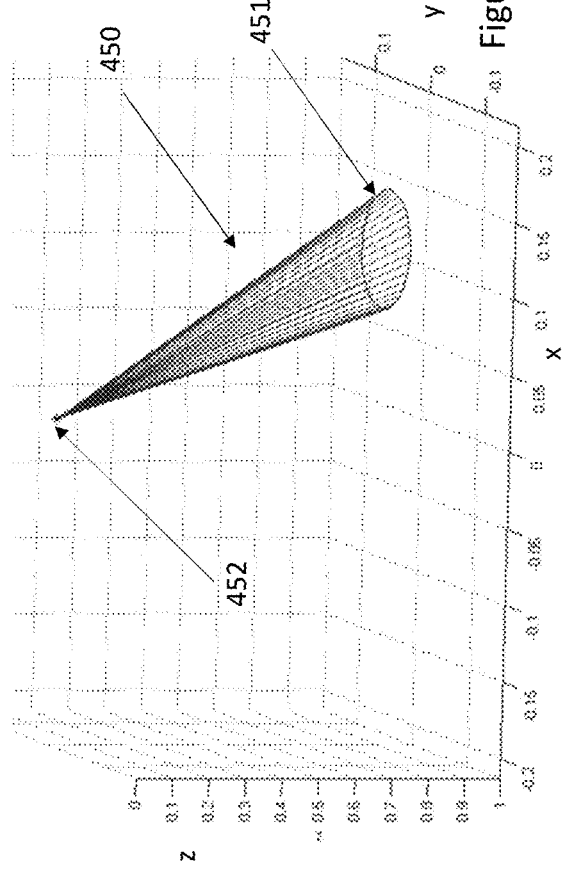
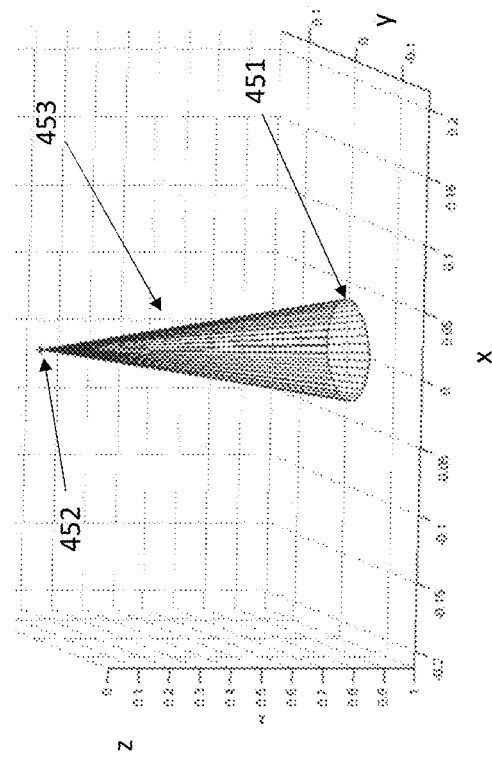

IMAGE ACQUISITION SYSTEM FOR OFF-AXIS EYE IMAGES

CROSS-REFERENCE TO RELATED APPLICATIONS

This application is a continuation of U.S. patent application Ser. No. 16/410,559 filed May 13, 2019, which is incorporated by reference herein in its entirety.

FIELD

The present invention relates to an image acquisition system capable of operating on eye images where a subject's gaze is off-axis relative to an optical axis of the system.

BACKGROUND

The iris surrounds the dark, inner pupil region of an eye and extends concentrically to the white sclera of the eye. A. K. Jain, A. Ross, and S. Prabhakar, "An introduction to biometric recognition," IEEE Trans. Circuits Syst. Video Technol., vol. 14, 2004 discloses that the iris of the eye is a near-ideal biometric.

For the purposes of iris-based recognition/authentication, during an acquisition phase an image of a subject comprising an iris region is acquired with an imaging system, typically using infra-red (IR) illumination to bring out the main features of an underlying iris pattern. Then, eye/iris detection is applied over the acquired image to identify a region of the image containing the iris pattern. Iris segmentation is performed on the detected region of the image in order to define an iris segment. The extracted iris code can be used in conjunction with iris code(s) acquired and stored in an enrolment phase to recognise or authenticate the subject of the image.

Conventional iris biometrics algorithms operate under the assumption that the subject cooperates during the enrolment and acquisition phases by looking directly into the camera, in such a way as the subject's gaze is close to, or actually parallel to the optical axis of the camera of the image acquisition system.

These scenarios are referred to as on-axis gaze imagery, where acquired images include an almost circular iris whose texture is isotropic. Thus, a best possible iris template can be generated from the intermediate region between the iris-pupil and iris-sclera boundary, which identifies the subject.

However, in virtual, augmented or mixed reality (VR, AR, MR) applications, fewer restrictions may be imposed on a user's direction of gaze (eye pose) when they are being recognized/authenticated. Furthermore, the imaging system can be embedded in apparatus such as a helmet or glasses that are worn by a user where the system camera is offset rather than disposed directly in front of the user such as when a user authenticates to a typical smartphone.

As such, in these applications the user's gaze is rarely, if not ever, aligned to the optical axis of the camera and a significant offset angle, even of an average 45°, along with a significant fluctuation in that angle as the user's gaze changes, can be present between the direction of user's gaze and the optical axis of the camera when an image of the user's eye region is to be acquired as part of recognition/authentication.

These scenarios, where the eye pose is not collinear with the principle point of the camera, are referred to as off-axis gaze imagery. In these scenarios, the offset between the user's gaze and the optical axis of the imaging system causes a distortion of the circular shape of the iris, resulting in an elliptical shape having an eccentricity that varies with the offset. An exemplary off-axis iris image having an elliptical shape is illustrated in FIG. 1 where the discrepancy in area between an inner circular approximation 1 and an outer circular approximation 2 of an imaged off-axis iris are evident.

It will be appreciated that accurate detection of the iris boundaries is important in iris recognition. Inaccurate boundary detection can result in areas of the sclera and/or periocular region being wrongly included or regions of the iris being wrongly excluded in the extracted iris templates.

In ISO standard images and other images typically used for iris recognition, the iris-sclera boundary is conventionally modelled as a circle, and detecting one point on each side of the circular boundary is considered sufficient. However, as can be seen from FIG. 1, a circular segmentation may not be sufficient for achieving an accurate segmentation in case that the eccentricity of an off-axis imaged iris is quite high. Thus, if the radius of the segmentation circle is set to correspond to the minor axis of the elliptic iris shape (circle 1 in FIG. 1), parts of the iris will be excluded from the segmentation and resulting iris template. Alternatively, parts of the sclera and/or the periocular region (e.g. of the eyelid) will be wrongly included in the iris template if the circle radius is set to the major axis of the ellipse (circle 2 in FIG. 1).

Similarly, dissimilarities between iris images acquired during the acquisition phase and the enrolment phase, that are due to different user's direction of gaze, can cause errors in the recognition/authentication of the user, thus negatively affecting the False Acceptance Rate (FAR) and False Rejection Rate (FRR) of the system.

"An Investigation of Iris Recognition in Unconstrained Environments", by Richard Bonner, Doctor of Philosophy (PhD) thesis, University of Kent, discloses the use of multiple gaze angles for images acquired at the enrolment phase to reduce errors in recognition systems operating on off-axis eye images. The principle underlying this solution is that comparing an authentication template acquired when the user is looking in a similar direction to that used for an enrolment template will provide a more reliable result than comparing two templates acquired when the user is looking in different directions. The use of several enrolment templates acquired from different gaze angles is also known in biometric modes other than iris recognition, such as face recognition.

Nevertheless, a comparison between an authentication template and each of several enrolment templates associated with any potential users of the system can be computationally demanding.

Another effect that can cause errors in the recognition/authentication of a user in off-axis eye images is cornea refraction, occurring when light rays extending from the pupil's boundary are refracted at the cornea surface. This refraction causes non-linear distortions of the imaged iris captured by the camera and, therefore, in the extracted iris texture. The distortions can negatively impact the comparison between the extracted iris texture and iris textures stored in the enrolment templates. The degree of the distortion increases as the angle between the eye gaze and the optical axis of the camera increases.

Solutions for correcting angular distortions in iris templates extracted from off-axis eye images are disclosed in Stephanie Schuckers, Natalia Schmid, Aditya Abhyankar, Vivekanand Dorairaj, Christopher Boyce and Lawrence Hornak "On Techniques for Angle Compensation in Nonideal Iris Recognition" IEEE Transactions on Systems, Man, and Cybernetics, Part B (Cybernetics) volume 37(5) (Oct.) 2007. According to these solutions, methods adapted from camera calibration are used to train a network with known angular distortions (eye gaze angles), and with estimated angular distortions. Once the gaze angle is found, the image is corrected using an orthographic rotation in the image plane and the corrected iris image is treated as it were a frontal view image.

Joseph Thompson, Hector Santos-Villalobos, Mahmut Karakaya, Del Barstow, David Bolme and Chris Boehnen "Off-angle iris correction using a biological model" IEEE Sixth International Conference on Bio-metrics: Theory, Applications and Systems (BTAS) (October) 2013, discloses the use of a 3D biological model of the eye and cornea to infer the correction for cornea refraction. The 3D model is an approximation, i.e. a generalized model for all eyes, which does not use knowledge of individual subjects' physiological characteristics.

Advancements in information technology, especially related to augmented, mixed or virtual reality applications, have generated an increasing demand for iris biometrics which can perform in a reliable and efficient way, without relying on cooperation of the user in keeping their gaze aligned to the optical axis of the camera—a requirement that would result in a poor user experience in augmented, mixed or virtual reality.

SUMMARY

According to a first aspect, there is provided an image acquisition system according to claim 1, configured to model and correct, from a single image, distortions in iris texture due to cornea refraction, especially in the case of off-axis, poorly lit images such as images which can be obtained in VR, AR, MR applications.

In embodiments, a transformation is determined and applied to transform the iris ellipse or pupil ellipse fitted on respective iris and pupil boundary points (preferably transformed in camera coordinates or, alternatively, kept in the image space) into a corresponding iris circle or pupil circle (consistent with the actual gaze (pose) vector of the user's eye).

Where an iris circle is obtained, ellipses for defining an iris grid are generated by interpolating between the iris circle and the pupil ellipse transformed into the plane of the iris circle by applying thereto the same transformation applied to the iris ellipse to become circular. Similarly, where a pupil circle is obtained, ellipses for defining an iris grid are generated by interpolating between the pupil circle and the iris ellipse transformed into the plane of the pupil circle by applying thereto the same transformation applied to the pupil ellipse to become circular.

Due to the image distortion caused by the cornea, the pupil ellipse or the iris ellipse does not become circular when transformed by the determined transformation into, respectively, the iris circle plane or the pupil circle plane, respectively, but maintains a slight elliptical eccentricity.

As such, the interpolated ellipses of the iris grid reflect the shape disparity between the iris circle/pupil ellipse on the common plane or between the pupil circle/iris ellipse on the common plane and, therefore, mimic the compression and expansion of iris texture due to cornea refraction.

Therefore, when the iris grid is used to interpolate pixel values of the unwrapped iris region at grid points along the ellipses, the grid points are correctly positioned onto the iris region in such a way as to reflect the compression/expansion of iris texture due to cornea reflection. In this way, the distortions due to cornea refraction are accounted and compensated in the extracted iris texture.

According to a further aspect, there is provided an image acquisition system according to claim 14, configured to effectively determine an elliptical curve defining the iris-sclera boundary, even in the case of off-axis, poorly lit images such as images which can be obtained in VR, AR, MR applications.

In embodiments of the method, an iris radius determined from an initial estimation of the iris-sclera boundary as a circle is advantageously used to confine a search region for potential iris-sclera boundary points to be used in elliptical fitting. By confining the search region, the number of outliers (points actually not corresponding to the iris-sclera boundary) within the detected boundary points is reduced.

In some embodiments, the boundary points can be refined by removing outliers detected by considering the relative positions of the boundary points (e.g. by using statistics related to the relative point positions). Such a position-based point refinement is advantageously not affected by images conditions, such as the image contrast.

In some embodiments, iris-sclera boundary points can be searched on both sides of the iris, thus improving the accuracy of the elliptical fitting.

In some embodiments, a RANSAC algorithm can be performed to select a set of best potential iris-sclera boundary points, thus improving the accuracy and uniformity of the elliptical fitting results.

According to still another aspect there is provided an image acquisition system according to claim 23.

In embodiments of the system, during a user recognition/authentication phase, the system selects a sub-set of stored enrolment templates corresponding to a user's different gaze directions.

The selection is performed by comparing pupil geometric parameters in stored enrolment templates with pupil geometric parameters of an acquisition template generated during the recognition/authentication phase, with a view of determining those enrolment templates including pupil geometric parameters that best match the pupil geometric parameters of the acquisition template.

As such, the selected enrolment templates are those corresponding to a user's gaze direction that is the same or close to the user's gaze direction for the acquisition template. Therefore, the selected enrolment templates are those considered to be more suitable for use in recognizing/authenticating the user.

Advantageously, in the comparison between the pupil geometric parameters, the importance given to a disparity between the angles of rotation of the pupils relative to a shape disparity of the pupils is weighted so as to increase/decrease as the elliptical distortion of at least one of the compared pupils increase/decreases.

By selecting in this way, a sub-set of all the stored enrolment templates, the system can perform user recognition/authentication in off-axis gaze conditions with limited computational effort, while achieving low false acceptance and rejection rates.

BRIEF DESCRIPTION OF THE DRAWINGS

Embodiments of the invention will now be described, by way of example, with reference to the accompanying drawings, in which:

FIG. 12a-12c illustrate respectively, in homogeneous coordinates, an oblique elliptical iris cone, a non-oblique elliptical iris cone resulting from a rotation of the oblique elliptical iris cone, and an oblique circular iris cone resulting from a rotation of the non-oblique elliptical iris cone;

DESCRIPTION OF THE EMBODIMENTS

Figure 1:
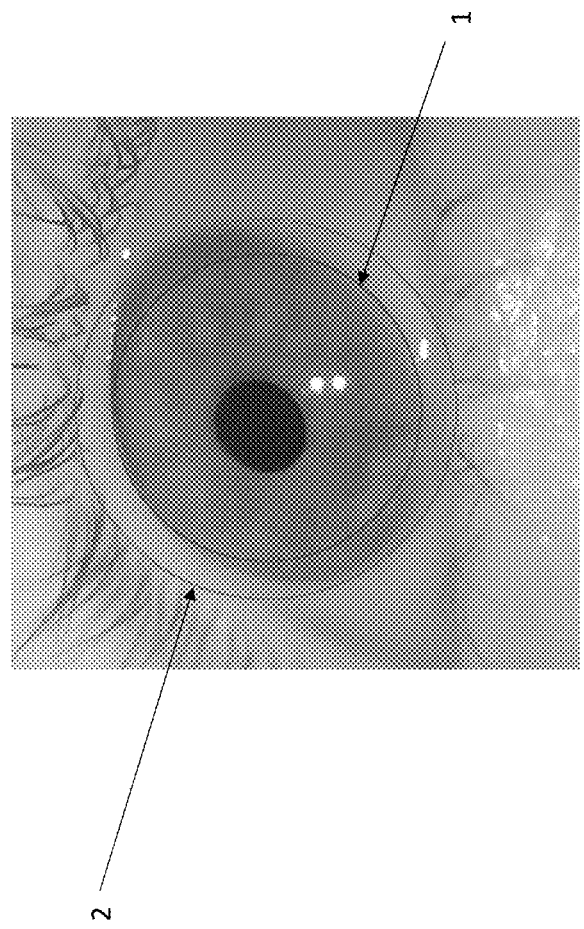
FIG. 1 illustrates circular approximations of an imaged elliptical iris region.
Figure 2:
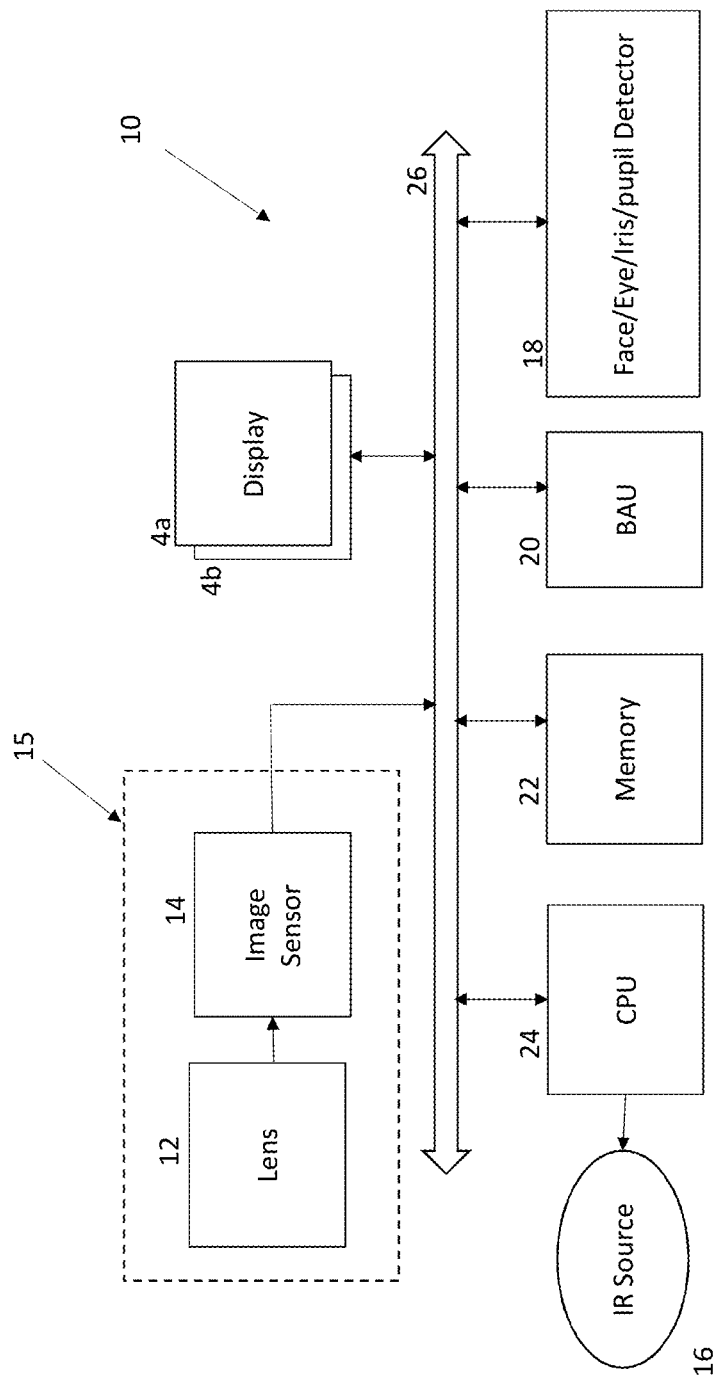
FIG. 2 illustrates an image acquisition system for iris recognition/authentication according to an embodiment of the present invention.

Referring now to FIG. 2, there is shown an image acquisition system 10 configured to operate according to an iris recognition/authentication method according to an embodiment of the present invention.

The system 10 comprises a lens assembly 12, an image sensor 14, and at least one IR illumination source 16 capable of acquiring an image, such as a facial image of a predetermined subject to be recognized or authenticated by the system 10. The lens assembly 12 is configured for focusing IR light reflected from the subject illuminated by the IR illumination source 16 onto the sensor 14. The lens assembly 12 and image sensor 14 can be incorporated within a camera module 15.

In some embodiments, the camera module 15 is incorporated within a VR, AR or MR apparatus, such as a headset, helmet or glasses. VR apparatus typically comprise a headset in which a pair of displays 4a,4b are provided directly in front of a user's eyes so that the displays span the user's field of view and the user can be immersed within a displayed artificially generated environment. AR apparatus typically comprise a transparent visor onto which artificial images are projected so that they can be superimposed on the user's field of view of an external environment. Typically, the projected images comprise objects providing information relating to real objects in the external environment. MR apparatus typically incorporate one or more headset cameras and augment the image streams acquired by these camera(s) with artificial objects before they are displayed in front of a user.

In any case, as the displays 4a, 4b of these apparatus typically occupy the area immediately in front of a user's eyes, the user facing camera module 15 is disposed towards the periphery of these headsets and so off-axis from a subject when gazing in a frontward direction.

In some embodiments, a pair of camera modules (only one shown) can be provided, each disposed off-axis and directed towards respective user's eyes to produce separate images of a user's eyes as required.

Typically, images acquired from the image sensor 14 are written into memory 22 as required either by applications being executed by a CPU 24 or other dedicated processing blocks 18, 20 which have access to the image sensor 14 and/or memory 22 across a system bus 26. In the embodiment, the system 10 further comprises a dedicated face/eye/iris/pupil detector 18 for identifying a face region within an acquired image, and within a given face region, one or more eye regions and iris/pupil regions within those eye regions. Some of all of these functionalities could equally be implemented in software executed by the CPU 24 or other dedicated circuitry of the system 10.

Iris regions identified within an acquired image can be used as an input for a biometric authentication unit (BAU) 20. The BAU 20 is configured for analysing the received iris regions in order to detect whether they belong to a predetermined subject enrolled to the system within an enrolment phase. The BAU 20 is preferably configured to compare the received one or more iris regions with reference iris region(s) associated to the each of the subject enrolled to the system 10, which can be stored in memory 22, within secure memory in the BAU 20 or in any location accessible to the BAU 20. This functionality could equally be implemented in software executed by the CPU 24 or other dedicated circuitry of the system 10.

One or more of the modules/functionality 16, 18, 20, 22 and 24 can be integrated with or be implemented separately from the camera module 15 and communication of image information between the module 15 and these modules/functionality 16, 18, 20, 22 and 24 may be implemented in any suitable fashion and employ any wired or wireless communication medium.

Figure 3:
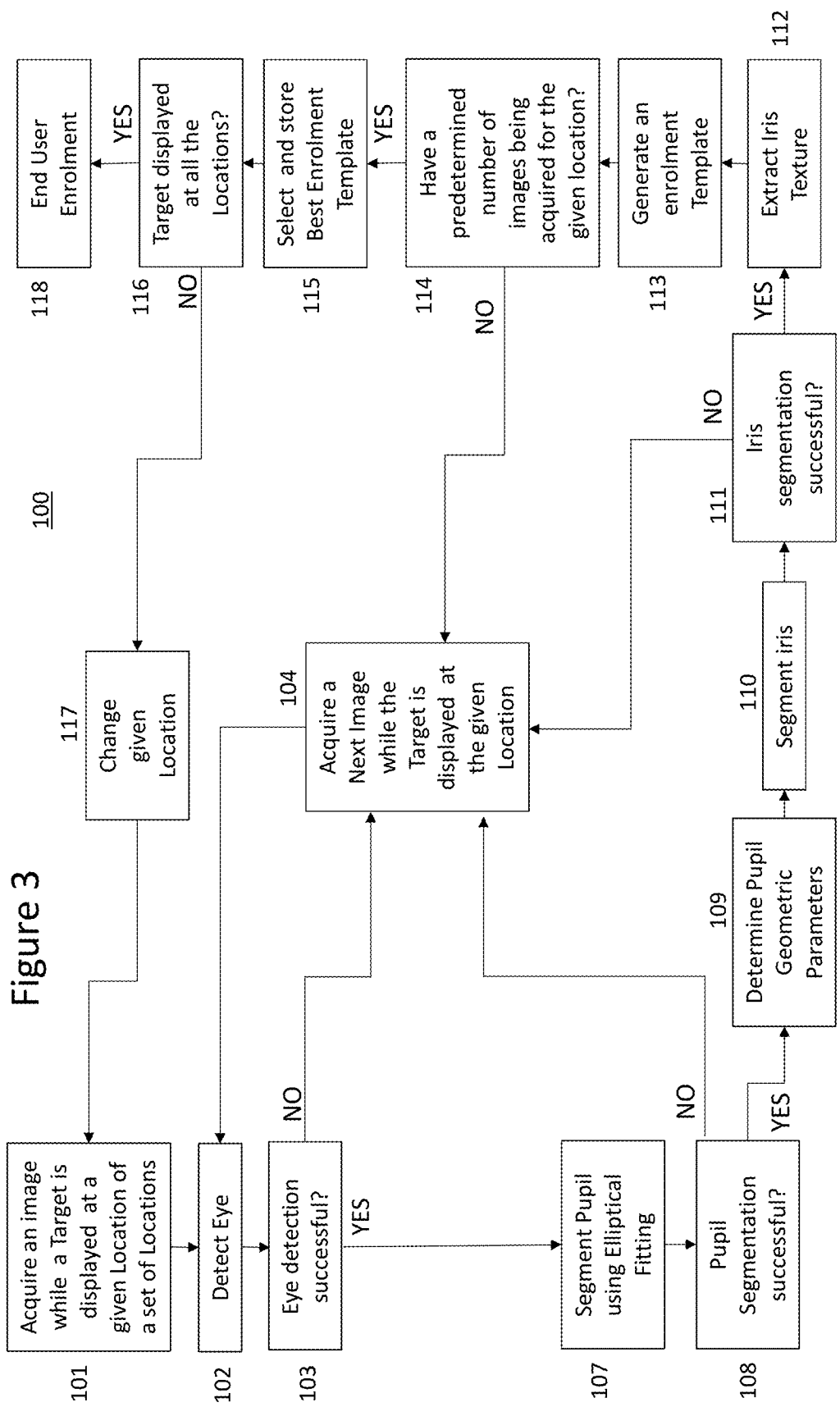
FIG. 3 illustrates an enrolment process for the system of FIG. 2.

With now reference to FIG. 3, there is illustrated a user enrolment process 100 operable within the system 10.

Upon user initiation of the enrolment phase, a target 3 is displayed in a sequence of different locations on each of the displays 4a,4b.

Figure 4:
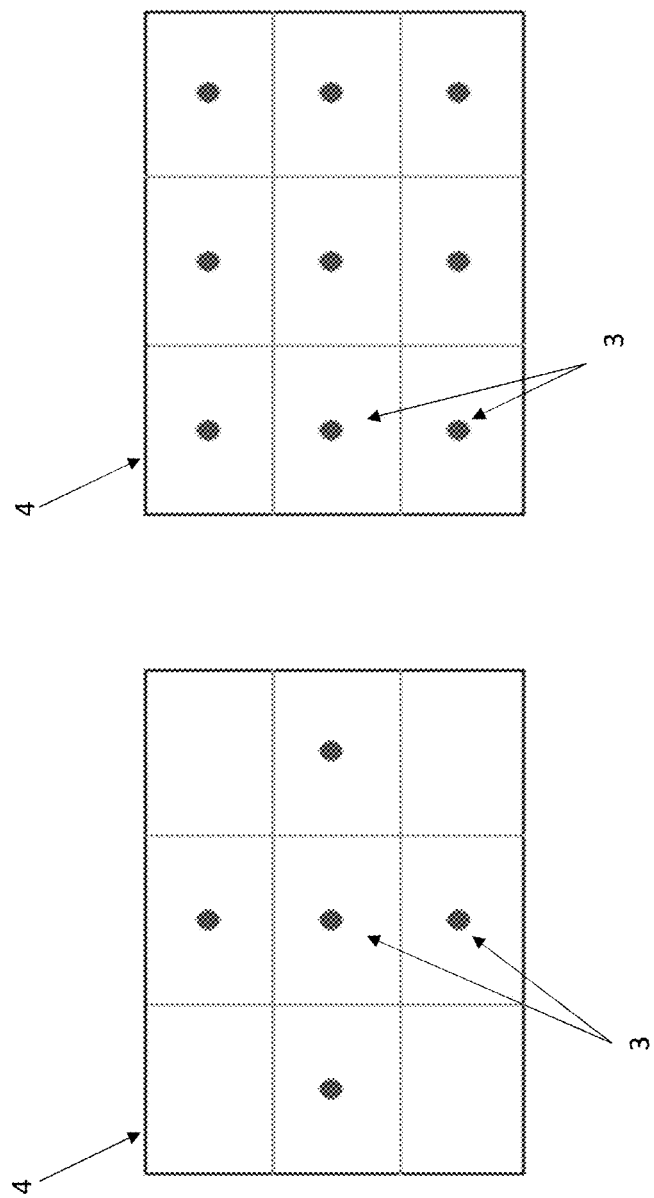
FIG. 4 illustrates exemplary sets of displayed target locations which can be used in the enrolment process of FIG. 3.

The user cooperates by looking at the displayed target when indicated to do so, thus changing their gaze direction relative to the camera module(s) 15 as the location of the target changes. FIG. 4 illustrates two exemplary sets of target locations 3 for displays 4a,4b. It is to be appreciated that, the number and relative position of the target locations can be different than the illustrated ones, depending on different use applications and requirements.

The camera module 15 of the system 10 is positioned relative to the displays 4a,4b in such a way as to be capable of acquiring, through the image sensor 14, enrolment images of at least a portion of the face of the user comprising their eye region looking towards the various indicated target locations. For example, the camera module 15 can be positioned at the upper boundary of the displays 4a,4b.

Furthermore, the CPU 24 or a dedicated control module can be operatively connected to the displays 4a,4b in such a way as to synchronize the acquisition of images to the display of the targets at respective locations.

During the acquisition of the enrolment images, it is assumed that the centre of the eyeball of the user lies close to the optical axis of the camera module 15, in such a way as the acquired image contains at least one detectable eye region of interest. Furthermore, it is assumed that the relative locations and orientations of the eyeball centre, camera's optical centre and camera's optical axis do not change significantly.

With reference back to FIG. 3, while the target is displayed at a given display location, an image including a face portion of the user looking towards the target is acquired by the image sensor 14 (step 101).

Then, eye detection is performed on the acquired image (step 102) by the detector module 18 of the system 10. There are a number of approaches to detecting an eye region within an image and these can be based for example on traditional type classifiers such as Haar classifiers, active appearance models (AAM) or more recently classifiers such as random tree classifiers (RTC) or neural network type classifiers. A crop or bounding box delimits the identified face region containing the eye.

Then, it is determined whether the eye detection succeeded (step 103). In response to a failed eye detection, a new image can be acquired while the target is still displayed at the given location (step 104) and the eye detection is repeated on the new image (step 102).

In response to successful eye detection, pupil detection is performed by the module 18 of the system 10 on the identified eye region by attempting to fit an ellipse to the pupil-iris boundary (step 107). For example, potential points on the iris-pupil border are determined and an ellipse is fitted to these points, removing outlying points until either there are insufficient points or the mean error between the points and the ellipse falls below a threshold. This process can for example, employ least-squares fitting techniques, but it will be appreciated that any suitable fitting technique can be employed.

Then, it is determined whether the pupil segmentation succeeded (Step 108). In response to a failed pupil segmentation, a new image can be acquired while the target is still displayed at the given location (step 104) and the process is repeated on the new image starting from the eye detection step 102.

In response to a successful pupil segmentation, pupil geometric parameters are determined including, but not limited to, a ratio between major and minor axes and an angle of rotation of the fitted ellipse. Preferably, the angle of rotation is the angle between the minor axis of the fitted ellipse and a horizontal axis of the acquired enrolment image. Alternatively, the angle of rotation can be the angle between the minor axis and the vertical axis (or other predetermined reference axis) of the enrolment image or between the major axis of the fitted ellipse and one of the horizontal and vertical axes (or other predetermined reference axis) of the enrolment image.

It will be appreciated that the greater the angle between the gaze of the user and the optical axis of the camera module 15, the greater the ratio between the major and minor axes—a measure which is indicative of the eccentricity of the ellipse.

At step 110, iris segmentation is completed by fitting an ellipse to the iris-sclera boundary. A particularly advantageous approach to fitting an ellipse to the iris-sclera boundary will be described in more detail below, but it will be appreciated that any suitable fitting technique can be employed or indeed other segmentation techniques can be used to segment the iris, not necessarily using an ellipse to fit the iris-sclera boundary.

Then, it is determined whether the iris segmentation succeeded (step 111). In response to a failed iris segmentation, again a new image can be acquired while the target is still displayed at the given location (step 104) and the process 100 is repeated on the new image starting from the eye detection (step 102).

In response to a successful iris segmentation, an iris texture is extracted from the segmented iris (step 112). A particularly advantageous approach to extracting iris texture from a segmented iris will be described in more detail below, but it will be appreciated that any suitable extracting technique can be employed.

The above mentioned pupil and iris segmentation, and the iris texture extraction can be performed by one or more of the modules 18, the CPU 24, the BAU 20 or other dedicated circuitry of the system 10.

A candidate image template for the given displayed target location is generated (step 113), containing at least the determined pupil geometric parameters and extracted iris texture.

Then, the process 100 proceeds by determining whether a predetermined number of images have been acquired for the given displayed target location (step 114).

In response to determining that the predetermined number of images has not been reached, the process 100 continues by repeating steps 102-114 for new images acquired at the given displayed target location, until the predetermined number of images is reached.

At this stage, the process 100 will have acquired a set of candidate image templates for the given displayed target location (each containing at least respective pupil geometric parameters and iris texture), and a selection is performed to identify a best image template among these candidates (step 115). For example, the best enrolment template is selected by comparing all the candidate templates to each other in order to determine the candidate template having greatest similarity to all the others. The selected enrolment template is stored in the memory 22, while the other candidate templates are discarded.

In this way, the enrolment template selected and stored for use in user recognition/authentication is ensured to be of high quality (e.g. by being the one less affected by shadows or iris occlusion due to blinking).

Then, the process 100 determines whether the target had been displayed in all the intended locations (step 116). In response to a negative determination, the target is displayed at another location (step 117), and the process 100 is repeated starting from the acquisition of a first image of the user while the target is displayed in the changed location. This is repeated until the target has been displayed at all the intended locations and a best enrolment template has been selected and stored for each of the displayed locations.

In response to determine at step 116 that the target has been displayed at all the intended locations, the enrolment process 100 for the user is terminated (step 118), and the whole process 100 can be repeated for any other users that wish to enrol to the system 10.

The final result of the above disclosed multi-angle enrolment process 100 is therefore a set of image templates maintained in the memory 22 or securely within the BAU 20 for each user enrolled to the system 100 and corresponding to different user's gaze directions.

Nevertheless, it can be appreciated that such set of image enrolment templates can be generated separately from the system 10 and then stored in the memory 22/BAU 20.

Figure 5:
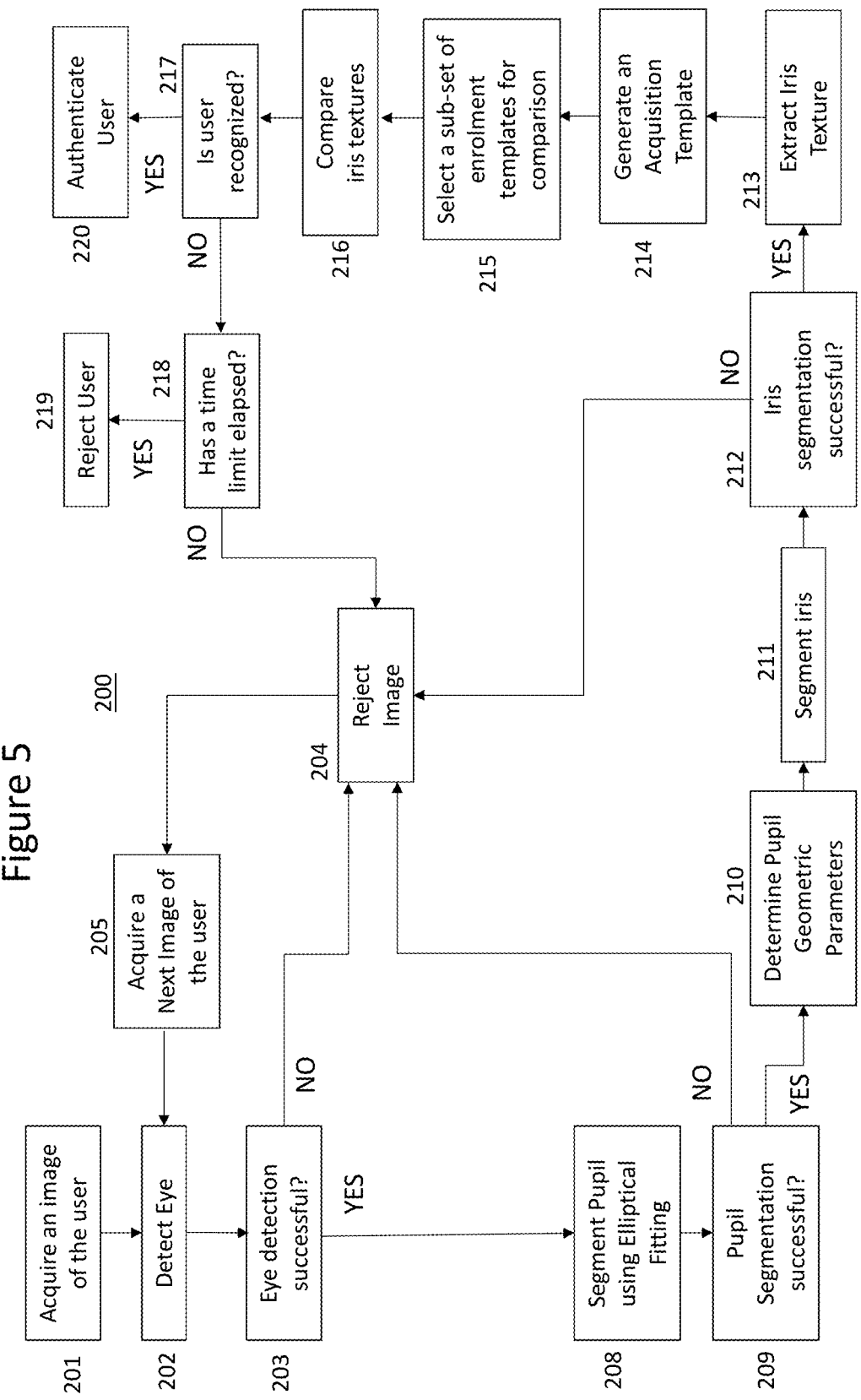
FIG. 5 illustrates an authentication process which can be performed on the system of FIG. 2.

With reference now to FIG. 5, there is illustrated an authentication process 200 which can be performed by the system 10 using the stored enrolment templates.

When a user authentication is required, the system 10 acquires, through the image sensor 14, an image comprising at least a face portion of the user (step 201). As discussed, the embodiment does not assume the user is gazing in any particular direction and so the gaze direction may be at any of a large range of angles to the optical axis of the camera module 15.

Again, it is assumed that the centre of the eyeball of the user lies close to the optical axis of the camera module 15, in such a way as the acquired image contains at least one detectable eye region of interest.

Eye detection is performed on the acquired image (step 202) by the detector module 18 of the system 10. The following steps 208 to 214 are performed in a manner analogous to steps 107 to 113 so that after step 214, an acquisition template along with determined pupil geometric parameters and extracted iris texture is available for an acquired image (which may have required a number of iterations through the loop 204,205).

In the process 200 illustrated in FIG. 5, a new image can be directly acquired after image rejection due to a failed eye/pupil detection or a failed pupil/iris segmentation, or the acquisition of the new image can occur subject to some conditions, e.g. a verification that a time limit allocated for the user authentication has not elapsed or a number of image rejections has not exceeded a threshold.

After step 214, the process 200 continues by selecting a sub-set of the stored enrolment templates, step 215.

The selection is based on comparing the pupil geometric parameters of the stored enrolment templates with the pupil geometric parameters of the acquisition template, with a view of determining those enrolment templates including pupil geometric parameters that best match the pupil geometric parameters of the acquisition template.

This is implemented by calculating a dissimilarity factor V relative to each stored enrolment template, according to the formula:

$$V = F(R_A, R_E) + W(R_A, R_E) * F(A_A, A_E),$$

where:

$R_A$ is the ratio of the elliptical major axis and minor axis included in the acquisition template, $A_A$ is the elliptical angle of rotation included the acquisition template, $R_E$ is the ratio of the elliptical major axis and minor axis included in the enrolment template, $A_E$ is the elliptical angle of rotation included in the enrolment template, $F(R_A, R_E)$ is a function of $R_A$, $R_E$ whose value is indicative of a shape disparity between the fitted ellipses associated with $R_A$ and $R_E$, $F(A_A - A_E)$ is a function of $A_A$ and $A_E$ indicative of a disparity between the angles $A_A$ and $A_E$, and $W(R_A, R_E)$ is a weight defined by a function of $R_A$, $R_E$ whose value increases/decreases as the value of at least one of $R_A$ and $R_E$ increases/decreases.

Preferably:

$$F(R_A, R_E) = |R_A - R_E|,$$

$$F(A_A, A_E) = |A_A - A_E|, \text{ and}$$

$W(R_A, R_E)$ is a function of $R_A + R_E$.

For example, $$W(R_A, R_E) = \left| \frac{RA + RE}{2} - 1 \right|.$$

It will be seen from above that comparison between pupil geometries associated with high-value $R_A$, $R_E$ and so higher $W(R_A, R_E)$ gives greater importance in the calculation of V to the angular disparity function $F(A_A, A_E)$ relative to the shape disparity function $F(R_A, R_E)$ than in the case of comparison between pupils associated with low-value $R_A$, $R_E$.

For example, when $$W(R_A, R_E) = \left| \frac{RA + RE}{2} - 1 \right|,$$

gives W=0 if $R_A$, $R_E$=1 (circular pupils). Instead, the value of W increases as at least one of $R_A$, $R_E$ increases (increasing elliptical distortion of the pupils).

This is advantageous because in the case where the compared pupils have a high elliptical eccentricity (high $R_A$ $R_E$), a value of V depending mostly on the shape disparity function $F(R_A, R_E)$ would not be as reliable (due to the high level of pupil elliptical distortion). On the other hand, in the case where the compared pupils are close to a circular shape (low $R_A$, $R_E$), the value V can more reliably depend mostly on the dissimilarity function $F(R_A, R_E)$ (due to the low level of pupil elliptical distortion).

The calculated value of V can be compared to an acceptance threshold in order to determine whether the pupil geometric parameters of the enrolment templates are close enough to the pupil geometric parameters of the acquisition templates.

The result of step 215 is therefore a sub-set of significant enrolment templates whose iris textures are compared to the iris texture contained in the acquisition template (step 216) in order to determine whether the user is recognised as one of the users enrolled to the system 10 (step 217). For example, respective comparison scores are calculated and if one or a greater predetermined number of comparison scores is below a dissimilarity threshold or above a similarity threshold, the user is authenticated (step 220).

The iris texture comparison can be performed by the BAU 20 of the system 10. Alternatively, this functionality can be performed by the CPU 24 or another dedicated module of the system 10.

In response to user recognition at step 217, the user is authenticated (step 220). Accordingly, a device or apparatus embedding the system 10 (such as a VR, MR, AR apparatus) can be enabled to securely operate. It will be appreciated that the steps 201-217 of the process 200 can be equally applied to other user identification or recognition applications.

If the user is not recognized at step 217, it is determined whether a predetermined time lapsed from the beginning of the authentication process 200 (step 218).

In response to determining that the time lapsed, the user is finally rejected (step 219).

In response to determining that the time has not yet lapsed, a new image of the user is acquired (step 205) and the process 200 is repeated on this new image starting from the eye detection (Step 202).

Figure 6:
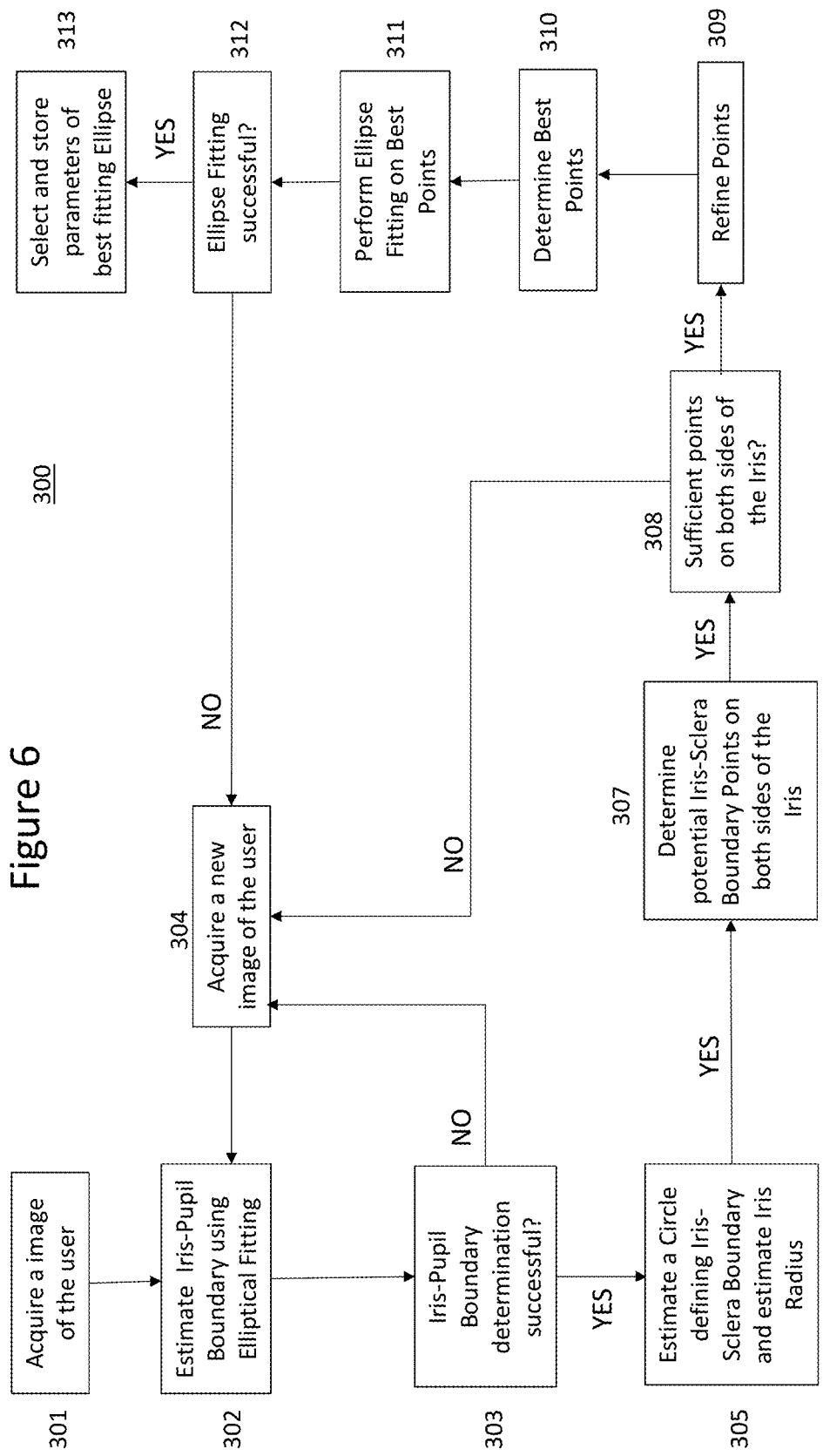
FIG. 6 illustrates a method for determining an ellipse defining an iris-sclera boundary according to an embodiment of the present invention.

With reference now to FIG. 6, a particularly advantageous method 300 for fitting an ellipse to an iris-sclera boundary is disclosed, operable within the system 10 (by one or more of the modules 18, the CPU 24, the BAU 20 or other dedicated circuitry of the system 10).

After an image of the user is acquired by the image sensor 14 (step 301), an iris-pupil boundary is located and estimated using elliptical fitting (step 302).

In case the method 300 is operated for performing the iris segmentation at steps 110 and 211 of the above disclosed multi-angle enrolment and authentication processes 100, 200, the execution of initial steps 301-302 is included in the execution of steps 101-109 and 201-210.

However, it is to be appreciated that method 300 can be operated independently from an execution of the multi-angle enrolment and authentication processes 100, 200, and is not limited to VR, AR or MR applications.

In particular, according to different applications, the image acquired at step 301 can either contain a close-up of the eye occupying a largest portion of the image (as especially in VR, AR or MR or other applications where the camera module 14 is positioned close to the user's eyes), or the acquired image can be a facial portion imaged at greater distances but containing at least one detectable eye. Especially in (but not limited to) the latter case, before performing step 302, a region of interest for iris boundary determination may be specified by estimating a bounding box or crop delimiting the eye and/or an initial rectangular iris bounding box (from which a pupil-iris boundary and an initial estimate of a circle defining the iris-sclera boundary can be successively computed).

It is to be appreciated that regardless the particular type of acquired images or specification of a region of interest, the method 300 can be successfully performed as long as the acquired images contain at least one eye and the lighting conditions are such that a contrast between at least a portion of the iris and sclera is detectable.

With reference back to FIG. 6, it is determined whether the iris-pupil estimation succeeded (step 303).

In response to a failed estimation, a new image of the user can be acquired (step 304) and step 302 is repeated on this new image.

In response to a successful iris-pupil boundary estimation at step 302, the method 300 proceeds by estimating a circle defining an iris-sclera boundary and a corresponding radius for the circle (step 305).

Preferably, the estimation of the iris-sclera boundary as a circle can be performed by defining a virtual annulus containing the iris-sclera boundary using the centre of the pupil and the elliptical properties (e.g. ratio of major and minor axes and angle of orientation) of the estimated iris-pupil boundary.

In one simple example, the external limit of the annulus could be defined by using a predetermined annular distance of the iris from the iris-pupil boundary, greater than a maximum expected extension of the iris from the pupil (taking in consideration pupil dilation).

Figure 7:
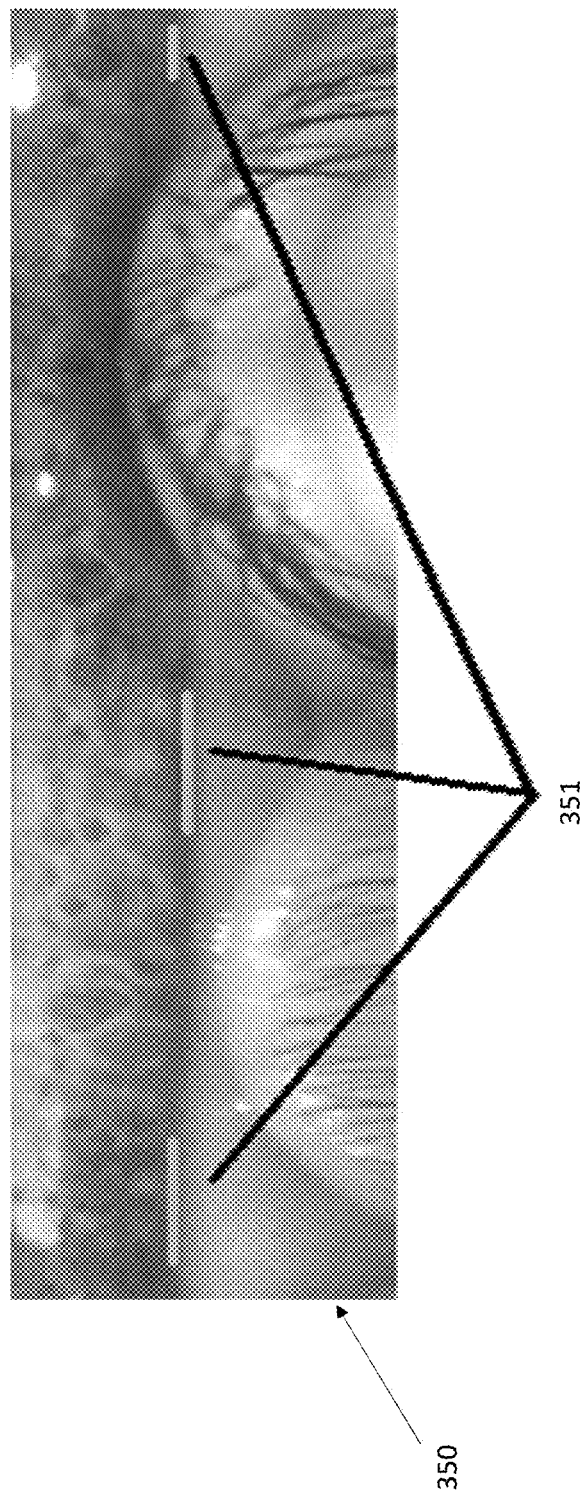
FIG. 7 illustrates an unwrapped rectangular image of a virtual annulus containing the iris-sclera boundary.

On the other hand, this boundary can be estimated more closely through analysing the texture of the iris portion of the image. With reference to FIG. 7, in this case, an annulus extending from the pupil boundary to an outer radius at least as long as a maximum iris radius is unwrapped into a rectangular image 350 and pixel intensity differences are determined within this image 350, by scanning each column from top to bottom, in order to detect portions of the iris-sclera boundary 351. Having detected these portions 351, the iris radius can then be estimated on both sides (left and right) of the iris, for example based on the distance between the detected iris-sclera boundary portions 351 and the centre of the pupil.

In response to a successful iris radius estimation, the method 300 proceeds by determining potential iris-sclera boundary points on both left and right sides of the iris (step 307).

Figure 8:
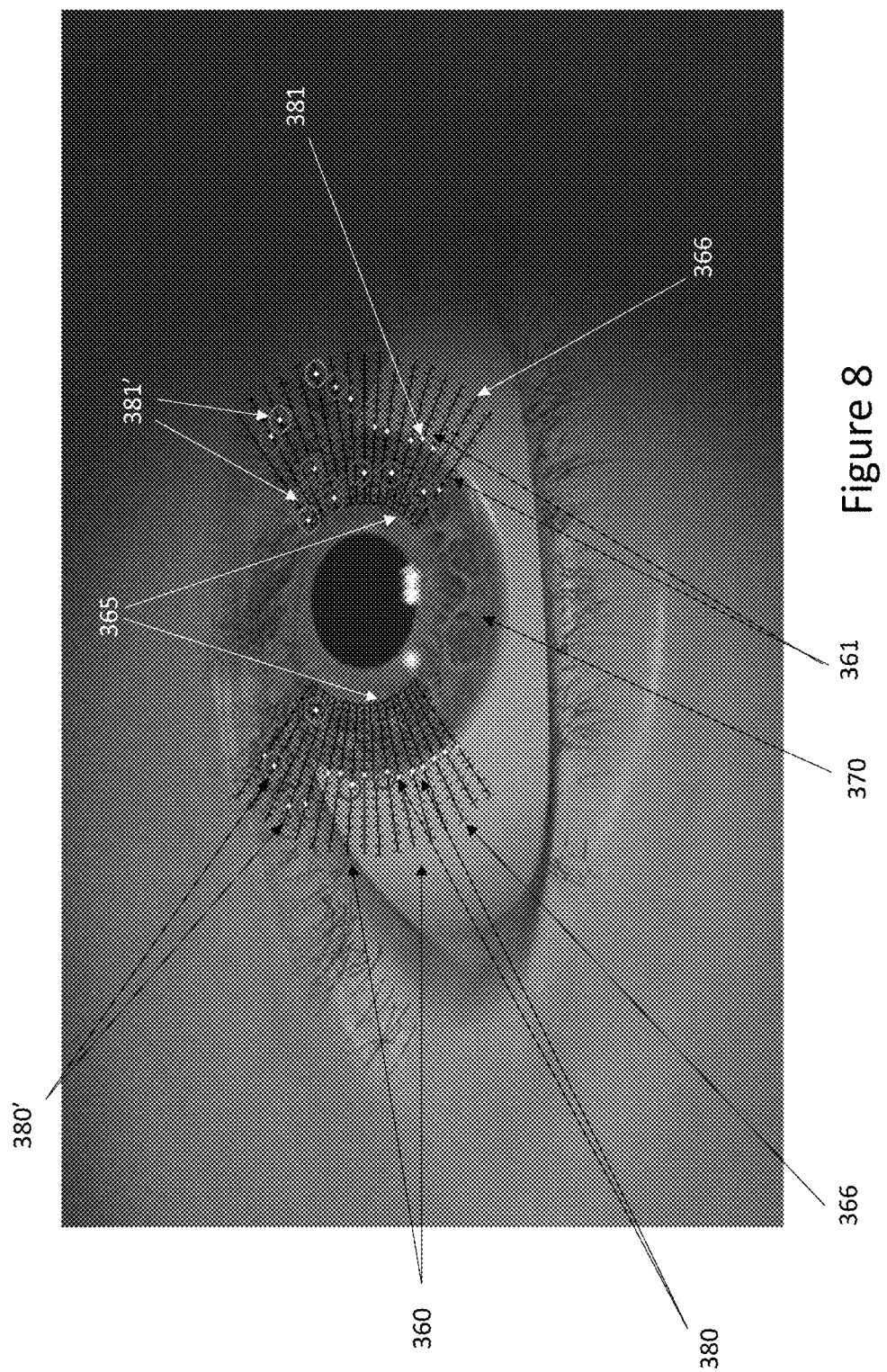
FIG. 8 illustrates potential iris-sclera boundary points determined according to the method of FIG. 6.

In particular, with reference to FIG. 8, a first set of (left extending) radiating line segments 360 and a second set of (right extending) radiating line segments 361 are defined, extending along corresponding lines passing through the pupil centre and crossing the estimated circle defining the iris-sclera boundary of the iris 370. The number of segments 360 can be equal to or different than the number of segments 361. The segments are distributed around respective arcs extending around a pre-specified range of angles. In the illustrated example, each set of segments 360, 361 comprises 17 line segments extending around an arc of approximately 90° (in elliptical angular measurement) centred about the horizontal axis. It will be seen that these extend generally laterally in a direction likely to intersect with the relatively well-defined iris-sclera boundary, rather than a boundary of the upper or lower eyelid.

The iris radius estimated at previous step 305 is used to define the range of each line segment 360, 361, in such a way that the line segments 360, 361 are confined within a limited annular region containing the circle estimated to define the iris-sclera boundary. For example, starting points 365 of the line segments 360, 361 can be positioned inside the circle about at half the length of the estimated iris radius, and ending points 366 can be positioned at a distance from the respective starting points 365 that is about equal to the length of the estimated iris radius.

Then, each of the line segments 360, 361 is traversed for calculating a difference (differential) in intensity between adjacent pixels along the line segment 360, 361 (i.e., given a current pixel, a difference in intensity between the current pixel and pixels behind and ahead of the current pixel is calculated). The greatest calculated differential value for each line segment 360, 361 is stored in the system 10, e.g. in the memory 22 or the BAU 20. A set of potential iris-sclera boundary points 380, 381 is then determined, for each traversed line segment 360, 361, as the points corresponding to the greatest pixel intensity difference calculated along the respective line segment 360, 361.

As such, it is to be appreciated that the line segments 360, 361 define a searching region for potential iris-sclera boundary points 380, 381, and that this searching region is advantageously confined using the iris radius previously estimated at step 305.

In order to reduce searching errors due to image noise, smoothing may be performed in the search region defined by the line segments 360, 361, before traversing the line segments 360, 361 for identifying the boundary points 380, 381.

Then, it is determined whether a sufficient number of potential boundary points 380, 381 has been determined on both sides of the iris (step 308).

In response to a negative determination, a new image of the user can be acquired (step 304) and the method 300 is repeated staring from step 302.

In response to a positive determination, the potential boundary points 380, 381 are refined (step 309) in order to identify and remove outliers 380', 381' (e.g. the points highlighted by circles in FIG. 8).

For example, statistics relating to the relative positions of the boundary points 380, 381 along the respective line segments 360, 361 (e.g. the mean and/or standard deviation of the point positions along the respective line segments) are used to identify the outliers 380', 381'. In practice, the outliers 380', 381' are identified as those points having a position along their respective line segments 360, 361 that is significantly different than the average position assumed by the all potential boundary points 380, 381 along their respective line segments 360, 361.

Figure 9:
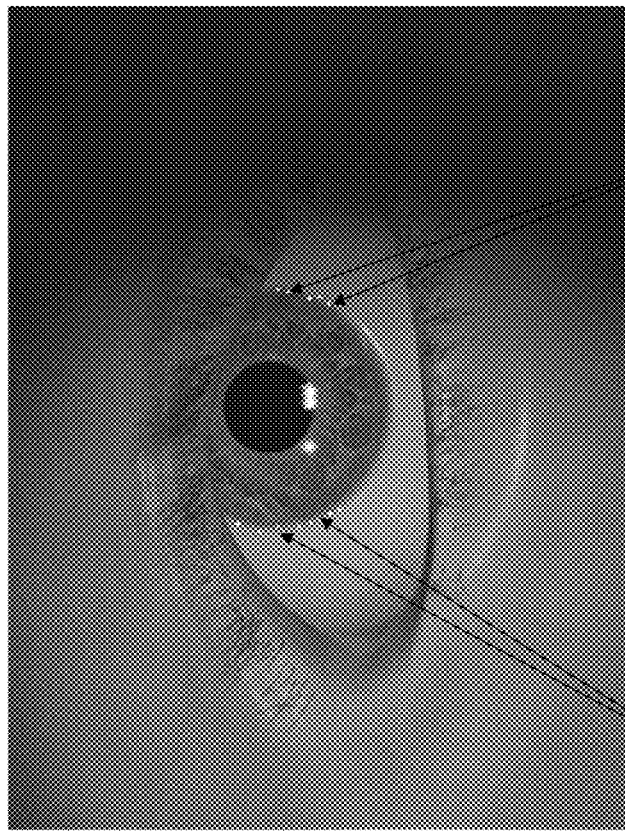
FIG. 9 illustrates a refined set of the points illustrated in FIG. 8.

Boundary points 380, 381 resulting from the refinement are shown for example in FIG. 9.

Although the refinement at step 309 can effectively reduce the number of outliners 380', 381', some outliers close to but not on the iris-sclera boundary may be not be identified and eliminated.

Thus, the method 300 proceeds by selecting, among the refined points, a set of best potential boundary points 380, 381 for both sides of the iris (step 310). In particular, a random sample consensus (RANSAC) algorithm is used to iteratively select the best potential boundary points 380, 381.

For example, based on the assumption that points closest to a horizontal reference image axis passing through the centre of the pupil are more reliable, greatest influence is assigned in performing the RANSAC algorithm to the potential boundary points 380, 381 lying on line segments 360, 361 that are closest to the reference horizontal axis.

An ellipse fitting is then performed on the selected best boundary points 380, 381 (step 311).

Then, it is determined whether the ellipse fitting succeeded (step 312). In response to a failed ellipse fitting, a new image of the user can be acquired (step 304) and the method 300 is repeated staring from step 302.

A successful ellipse fitting can result in a plurality of candidate fitting ellipses, one of which is selected and the corresponding parameters stored within the system 10 (step 313), e.g. in the memory 22 or the BAU 20.

The best ellipse is selected by evaluating the quality of the candidate ellipses. For example, the quality of each candidate ellipse can be determined using at least one of the following metrics: a ratio of the axes of the candidate ellipse compared to the pupil ellipse, a length of the major axis of the candidate ellipse comparted to the pupil ellipse (considering the limits to the relative sizes of iris and pupil that are due to dilation), and a gradient (difference in intensity between external-internal pixels) evaluated along the ellipse border within the limits set by the refined boundary points 380, 381 used for the ellipse fitting.

Figure 10:
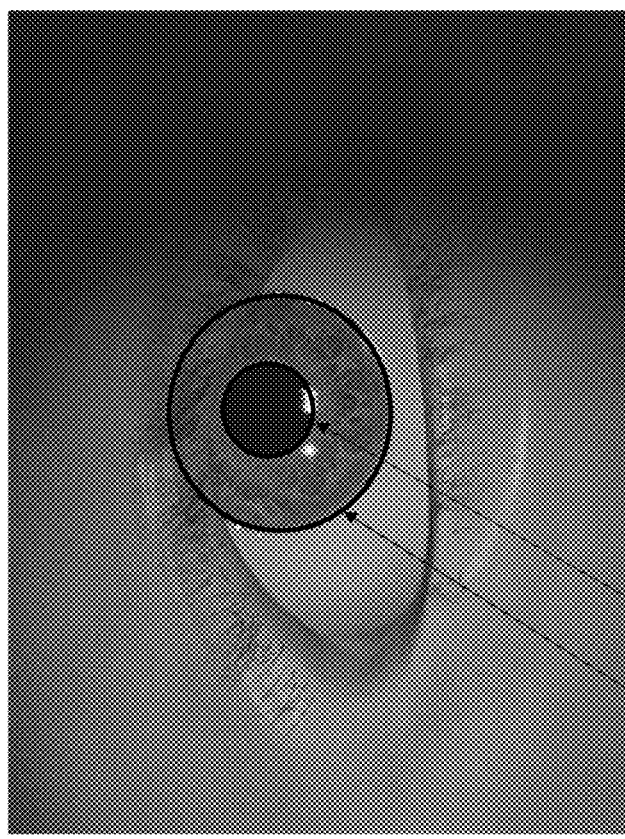
FIG. 10 illustrates an elliptical curve fitting the iris-pupil boundary, and an elliptical curve fitting the iris-sclera boundary and obtained from the refined set of points illustrated in FIG. 9.

An ellipse 385 obtained from the boundary points 380, 381 is illustrated for in FIG. 9 and that has been determined to best match the quality requirements is illustrated for example in FIG. 10 (together with the estimated ellipse 386 fitting the iris-pupil boundary).

The disclosed method 300 provides a particularly accurate and uniform elliptical fitting for determining the iris-sclera boundary, especially in case of off-axis images where the iris-sclera boundary is significantly elliptically deformed.

Although some solutions have been investigated to detect iris elliptical boundaries, these solutions are based on assumptions where the iris is still considered quite circular, as disclosed for example in "Elliptical Iris Detection using Morphological Operations" by Kulkarni and Kopanar, International Journal of Computer Science and Mobile Computing.

Another example of conventional ellipse detection of iris-sclera boundary in off axis images is disclosed in "Adapting Starburst for Elliptical Iris Segmentation", Ryan et al, BTAS 2008, where rays emanating from the centre of the pupil are used to determine the sclera-boundary points, but this method does not perform an initial estimate of the iris radius to confine the search range which results in an increased number of outliers (e.g. iris points close to the pupil or sclera points far from the iris). Probable eyelash and eyelid points on the top and bottom of the eye are excluded from the iris-sclera boundary detection. However, the boundary points are not refined by detecting and withdrawing outliers based on the point positions as in method 300, but based on luminance. As such, in images which have poor contrast the test for luminance may not be successful, and the resulting point refinement will be poor. Furthermore, there are not used points on both sides of the iris. Points which have a minimal angle therebetween are used, but not searching on both sides of the iris.

Figure 11:
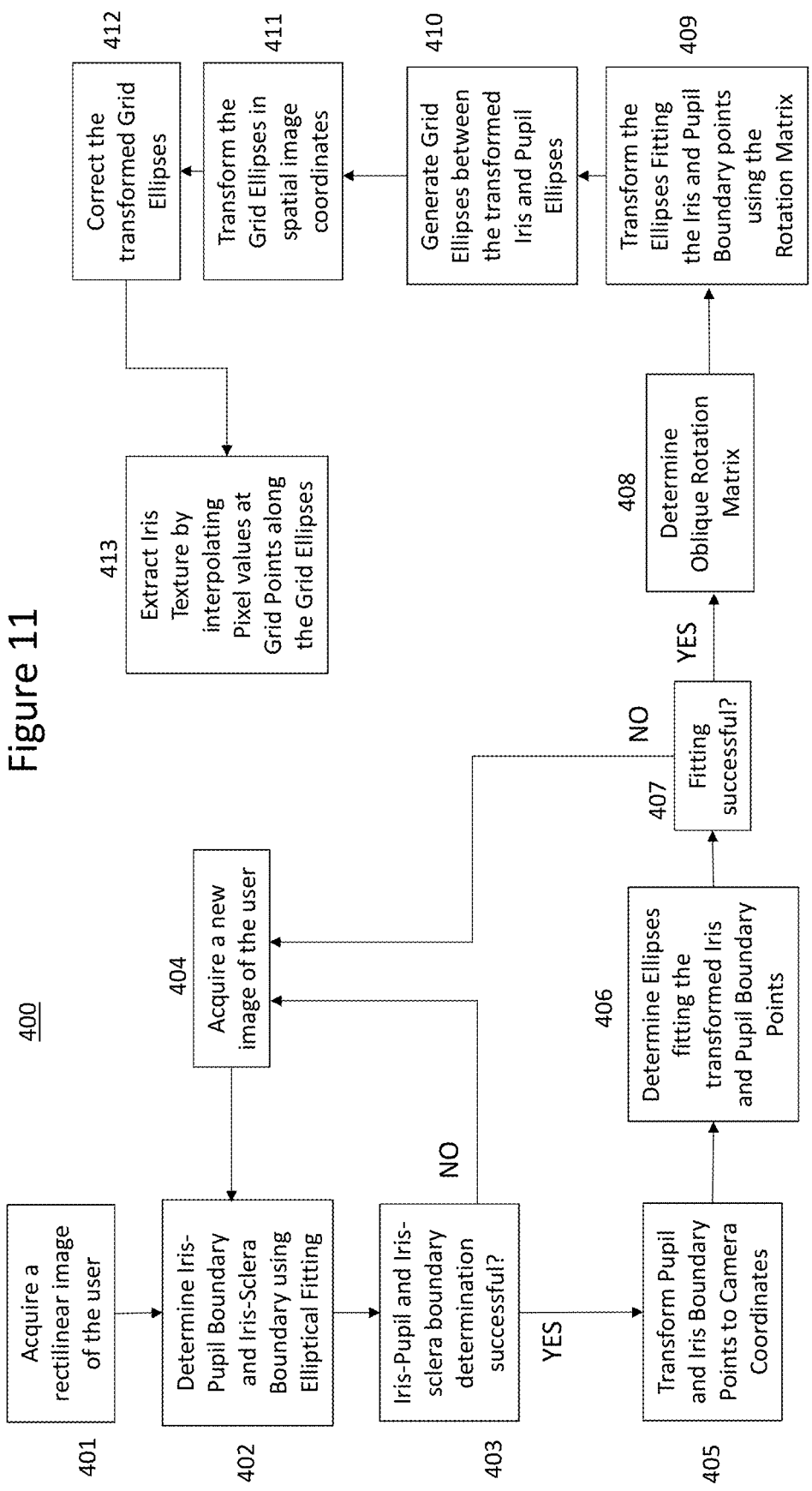
FIG. 11 illustrates a method for extracting iris texture from an image according to an embodiment of the present invention.

With reference now to FIG. 11, a particularly advantageous method 400 for extracting an iris template from a segmented iris region is disclosed, operable within the system 10 (by one or more of the modules 18, the CPU 24, the BAU 20 or other dedicated circuitry of the system 10).

The method starts by acquiring a rectilinear (non-spatially distorted) image of the user (step 401), assuming that the system 10 has been previously calibrated to remove from the acquired images distortions introduced by the camera module 15, e.g. distortions introduced by the lens 12 or misalignments of the sensors 14. In particular, a calibration process can be used to calculate correction parameters that, when applied to the acquired images, correct the spatial distortions introduce by the camera module 15 for obtaining an undistorted (rectilinear) version of the acquired images. Calibration algorithms that can be used by the system 10 are well-known, for example, those disclosed by Richard Hartley and Andrew Zisserman "Multiple View Geometry in Computer Vision" 2nd edition, Cambridge University Press (2003).

Furthermore, an intrinsic camera matrix $\hat{K}$ can be obtained from the calibration process, containing intrinsic parameters of the camera module 15 among which are the focal lengths and the principle point (optical axis) of the camera module 15.

After the acquisition of a rectilinear image at step 401, the iris-pupil boundary and the iris-sclera boundary are determined using elliptical fitting (step 402). Then it is determined whether these boundaries have been successfully estimated (step 403), and in case of unsuccessful estimation, method step 402 can be repeated on a new acquired image (step 404).

In case the method 400 is operated for performing the iris texture extraction at steps 112 and 213 of the above disclosed multi-angle enrolment and authentication processes 100, 200, the execution of the preliminary steps 401-403 is included in the execution of steps 101-111 and 201-212.

However, it is to be appreciated that method 400 can be operated independently from an execution of the multi-angle enrolment and authentication processes 100, 200, and is not limited to VR, AR or MR applications.

Furthermore, at step 403, the ellipse fitting of the iris-sclera boundary can be advantageously determined with particular accuracy, especially for an acquired off-axis image, using the above disclosed method illustrated in FIG. 6, but it will be appreciated that any suitable techniques that provide an adequately accurate estimation of ellipses fitting the iris and pupil boundaries can be equally employed.

In response to a successful determination of the ellipses fitting the pupil and iris boundaries, a set of points of each of these ellipses are transformed from the image plane to camera coordinates using the intrinsic camera matrix $\hat{K}$ (step 405).

As is known, locations in an image plane can be conventionally represented using pixel indices. This representation involves considering the image plane as a grid of discrete elements ordered in rows and columns. Each of these elements is addressed by a corresponding pixel index including a couple of integer values identifying the row and column to which the element belongs. Another known way for representing locations in an image plane is to use a system of continuously varying image spatial coordinates rather than discrete pixel indices.

The camera intrinsic matrix $\hat{K}$ allows a mapping between the image spatial coordinates and camera coordinates, thus allowing a transformation of the image spatial coordinates of the iris and pupil boundary points to corresponding camera coordinates. In particular, the iris and pupil boundary points can be transformed to corresponding camera coordinates according to the following equation:

$$\vec{x} = \hat{K}^{-1} \vec{p}$$

where $\vec{p}$ are the boundary points from the respective ellipses expressed in homogeneous spatial image coordinates (with the depth component $p_z$ set to be conventionally equal to 1):

$$\vec{p} = \begin{pmatrix} p_x \\ p_y \\ 1 \end{pmatrix}$$

and the camera intrinsic matrix $\hat{K}$ is calculated in such a way as the transformed boundary points $\vec{x}$ are expressed in homogeneous camera coordinates (with the depth component z set to be conventionally equal to 1):

$$\vec{x} = \begin{pmatrix} x \\ y \\ 1 \end{pmatrix}$$

An example of camera intrinsic matrix $\hat{K}$ that can be used for transforming the iris and pupil boundary points from homogenous spatial coordinates to homogeneous camera coordinates can be for example:

$$\hat{K} = \begin{pmatrix} f_x & 0 & x_p \\ 0 & f_y & y_p \\ 0 & 0 & 1 \end{pmatrix}$$

where fx, fy are the camera focal lengths in the x and y directions and xp, yp are the image spatial coordinates of the camera projection point.

Note that the 0 element in the first row of the matrix above is a pixel skew factor, which is typically equal to 0 for modern CCD elements (a good approximation).

After step 405, ellipses are fitted on iris and pupil boundary points moved to the camera space (step 406), so as to obtain the parameters A, B . . . E of respective ellipse matrixes $\hat{C}_i$ and $\hat{C}_p$. The obtained ellipse matrixes $\hat{C}_i$ and $\hat{C}_p$ are normalized to homogeneous coordinates in such a way as to have a final matrix element equal to −1, according to:

$$\hat{C} = \begin{pmatrix} A & B & D \\ B & C & E \\ D & E & -1 \end{pmatrix}$$

The ellipses can be fitted on the respective ellipse boundary points using linear least squares or any other alternative method such as disclosed in Per Christian Hansen, Victor Pereyra, Godela Scherer "Least Squares Data Fitting with Applications" Johns Hopkins University Press (2013).

Then, it is determined whether the fitting ellipses have been successfully estimated in homogeneous camera coordinates (step 407), and in case of unsuccessful estimation a new image of the user can be acquired (step 404) and the method 400 can be repeated starting from step 402.

Following on a successful fitting, the obtained ellipses will have an eccentricity depending on the angle between the optical axis of the camera module 15 and a gaze vector g of the imaged eye, which is the vector extending from the eye's 3D centre of rotation, through the iris centre.

While it is not possible to estimate the 3D eye centre from a single acquired eye image, there are approaches to estimate the eye's gaze vector $\vec{g}$ from the iris boundary ellipse in the acquired image, e.g. according to the disclosure of Reza Safaee-Rad, Ivo Tchoukanov, Kenneth Carless Smith, and Bensiyon Benhabib; "Three-Dimensional Location Estimation of Circular Features for Machine Vision". IEEE Transactions on Robotics and Automation, Vol. 8(5) pp. 624-640 October (1992) and Haiyuan Wu, Qian Chen and Toshikazu Wada; "Visual direction estimation from a monocular image". IEICE Transactions on Information and Systems, Vol. E86-D(5) pp. 1-9 May (2003). Haiyuan Wu, Qian Chen and Toshikazu Wada "Estimating the Visual Direction with Two-Circle Algorithm" Advances in Biometric Person Authentication. Lecture Notes in Computer Science, vol. 3338, Springer (2004).

According to these approaches, the eye's gaze vector $\vec{g}$ can be modelled using an oblique elliptical cone which extends from the principle point of the camera to the ellipse delimiting the imaged iris. In particular, based on the assumption that the 3D iris is circular, the gaze vector $\vec{g}$ can be modelled as a normal vector to a plane intersecting the ellipse cone along a circular curve.

With reference now to FIG. 12A, there is illustrated an oblique elliptical iris cone 450 in homogenous camera coordinates, having a base 451 corresponding to the fitted elliptical iris boundary placed on the z=1 plane and a vertex 452 in the camera principle point (corresponding, in camera coordinates, to the origin O (0,0,0) of the camera space), and the method 400 further comprises the step 408 of determining an oblique rotation matrix $\hat{W}$ for transforming the oblique elliptical iris cone 450 in an oblique circular iris cone 455 still having vertex 452 in the principle point of the camera module 15, but having a circular base 457 placed on the z=1 plane.

The oblique rotation matrix $\hat{W}$ can be calculated based on the approaches disclosed in Reza Safaee-Rad et al and Haiyuan Wu et al, or other similar or different approaches.

While multiple rotation matrixes can be mathematically obtained to solve the problem of transforming the oblique elliptical iris cone 450 into an oblique circular iris cone, it is to be appreciated that the rotation matrix $\hat{W}$ determined at method step 408 and used in the next method steps is the one consistent with the actual gaze vector $\vec{g}$ of the imaged eye. In other words, the rotation matrix $\hat{W}$ determined at method step 408 is the one that can be used to correctly estimate the actual gaze vector $\vec{g}$.

In more detail, with reference to FIG. 12a-12b, determining the rotation matrix $\hat{W}$ at step 408 can involve for example two sequential rotations. A first rotation from the oblique elliptical iris cone 450 illustrated in FIG. 12a to the non-oblique elliptical iris cone 453 illustrated in FIG. 12b, still having vertex 452 in the principle point of the camera module 15, but with the elliptical base 451 moved in the z=1 plane in such a way as to be aligned with the vertex 452. Then, a second rotation is applied to transform the non-oblique elliptical iris cone 453 to a circular elliptical iris cone Since there are two possible rotations of interest leading from the non-oblique elliptical iris cone 453 to an oblique circular iris cone, defining respectively a clockwise or contra-clockwise cone rotation around the y-axis, there are two corresponding rotation matrices $\hat{W}_1$, $\hat{W}_2$ that can both transform the non-oblique iris elliptical cone 453 into an oblique circular iris cone (only one of which is illustrated in FIG. 12c and indicated with numeral reference 455). Note that there are in fact 4 potential rotations, which include the 2 additional oblique circular cones in the z=−1 plane. However, the camera points along the +z axis in the coordinate system we are using, subsequently the eye's gaze vector has a negative z value. Since we force the gaze vector to have a negative z value we may safely ignore the additional 2 rotations.

Two corresponding vectors $\vec{g}_1$ and $\vec{g}_2$ can be obtained from $\hat{W}_1$, $\hat{W}_2$ for estimating the eye gaze vector. In particular, the estimate vectors $\vec{g}_1$ and $\vec{g}_2$ be calculated by applying an inverse rotation ($\hat{W}_1^T$, $\hat{W}_2^T$) to vectors $\vec{n}$ normal to the oblique plane, according to:

$$\vec{g}_1 = \hat{W}_1^T \vec{n}, \text{ and } \vec{g}_2 = \hat{W}_2^T \vec{n}$$

where $\vec{n} = (0\ 0\ 1)^T$, assuming that the camera looks along the positive z-axis, while the eye always looks along the negative z-axis.

As a result of the above formulas, the estimate vectors $\vec{g}_1$ and $\vec{g}_2$ will be normal to a first plane and a second plane, respectively, that are differently inclined in the camera space so as to intersect the oblique elliptical iris cone 450 along a first circular curve and second circular curve.

However, only one of the of these first and second planes is inclined such that the corresponding normal vector $\vec{g}_1$ and $\vec{g}_2$ correctly mimics the actual gaze vector $\vec{g}$ normal to the iris of the imaged 3D eye (that it assumed to be circular and concentric to the centre of the imaged 3D eye).

Using information on the image eye, e.g. a 2D estimation of the eye centre in image spatial coordinates, it is possible to select the rotation matrix $\hat{W}_1$, $\hat{W}_2$ corresponding to the correct gaze vector $\vec{g}$.

Figure 13:
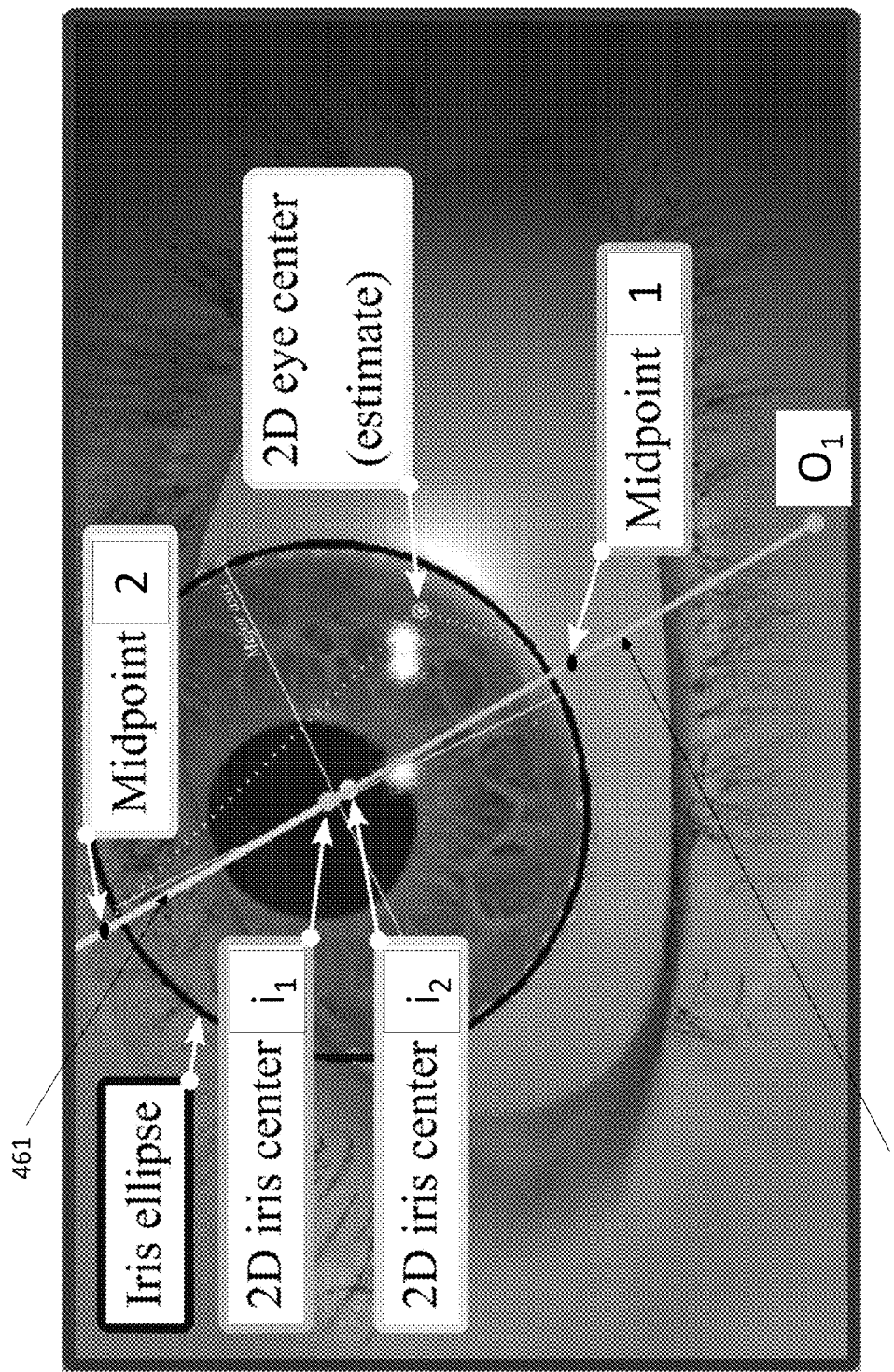
FIG. 13 illustrates, in an acquired image, a point corresponding to a 2D estimation of the eye centre and two axes connecting the origin and centres of two oblique iris circles determined according to the execution of the method of FIG. 11, and transformed back to the image space.

For example, with reference now to FIG. 13, the selection of the correct rotation matrix $\hat{W}_1$, $\hat{W}_2$ can comprise transforming the centres $\vec{c}_1$ and $\vec{c}_2$ of the circular bases of the oblique iris circular cones obtained by using the rotation matrixes $\hat{W}_1$, $\hat{W}_2$ to corresponding 2D iris centres $\vec{i}_1$ and $\vec{i}_2$ expressed in image spatial coordinates, using $\hat{W}_1$, $\hat{W}_2$ and the camera intrinsic matrix $\hat{K}$, according to:

$$\vec{i}_1 = \hat{K}\hat{W}_1^T \vec{c}_1, \vec{i}_2 = \hat{K}\hat{W}_2^T \vec{c}_2$$

Similarly, also the origins $\vec{o}_1$ and $\vec{o}_2$ of the oblique planes corresponding to the circular bases of the oblique circular iris cones obtained by using the rotation matrixes $\hat{W}_1$, $\hat{W}_2$ are transformed from the camera coordinates into corresponding 2D points $\vec{O}_1$ and $\vec{O}_2$ expressed in image spatial coordinates, using $\hat{W}_1$, $\hat{W}_2$ and the camera intrinsic matrix $\hat{K}$, according to:

$$\vec{O}_1 = \hat{K}\hat{W}_1^T \vec{o}_1, \vec{O}_2 = \hat{K}\hat{W}_2^T \vec{o}_2$$

Where $\vec{o}_1$, $\vec{o}_2 = [0\ 0\ 1]^T$ (which correspond to the normal to the oblique plane).

Only one of the transformed plane origins $\vec{O}_1$, $\vec{O}_2$ is illustrated in FIG. 13, together with the two obtained iris centres $\vec{i}_1$, $\vec{i}_2$ and an estimated point of the 2D eye centre. (The second origin is out of the image—the line 461 passes through it.) In particular, the estimated 2D eye centre illustrated in FIG. 13 corresponds to the image centre, and for an eye facing camera this is an adequately accurate estimation of the 2D eye centre. Anyway, it is to be appreciated that other techniques can be used to estimate the image spatial coordinates of the 2D eye centre.

Further illustrated in FIG. 13 there are lines 460, 461 joining, respectively, the iris centre $\vec{i}_1$ to the corresponding origin $\vec{O}_1$ and the iris centre $\vec{i}_2$ to the corresponding origin $\vec{O}_2$. These lines 460, 461 are indicative of a 2D representation in the image plane of the gaze vectors $\vec{g}_1$ and $\vec{g}_2$ estimated from the rotation matrixes $\hat{W}_1$, $\hat{W}_2$, and therefore, based on the assumption that the actual eye's gaze vector $\vec{g}$ passes though the centre of the 3D eye and of the iris, the actual image position of the 2D eye centre should lay on the one of the lines 460, 461 resulting from the correct $\hat{W}_1$, $\hat{W}_2$. Thus, distances between midpoints 462, 463 of the lines 460, 461 and the estimated 2D eye centre are determined, and the correct $\hat{W}_1$, $\hat{W}_2$ is selected as the one corresponding to the line 460, 461 at a shortest distance from the estimated 2D eye centre (that is line 460 in the example illustrated in FIG. 13).

Having determined the rotation matrix $\hat{W}$ corresponding to the actual eye's gaze vector $\vec{g}$, the ellipses fitting the iris and pupil boundaries in the camera space are both transformed using $\hat{W}$ into the iris oblique plane where the iris is a circle (method step 409).

In particular, the transformation is performed by applying the rotation matrix $\hat{W}$ to the iris and pupil ellipse matrices $\hat{C}_i$ and $\hat{C}_p$. In particular, the matrixes of the transformed ellipses are calculated according to:

$$\hat{Q}_i = \hat{W}^T \hat{C}_i \hat{W}, \hat{Q}_p = \hat{W}^T \hat{C}_p \hat{W}$$

Again, these transformed matrices are normalized to homogeneous coordinates in such a way as to have a final matrix element equal to −1 according to the form:

$$\begin{pmatrix} A & B & D \\ B & C & E \\ D & E & -1 \end{pmatrix}$$

Figure 14:
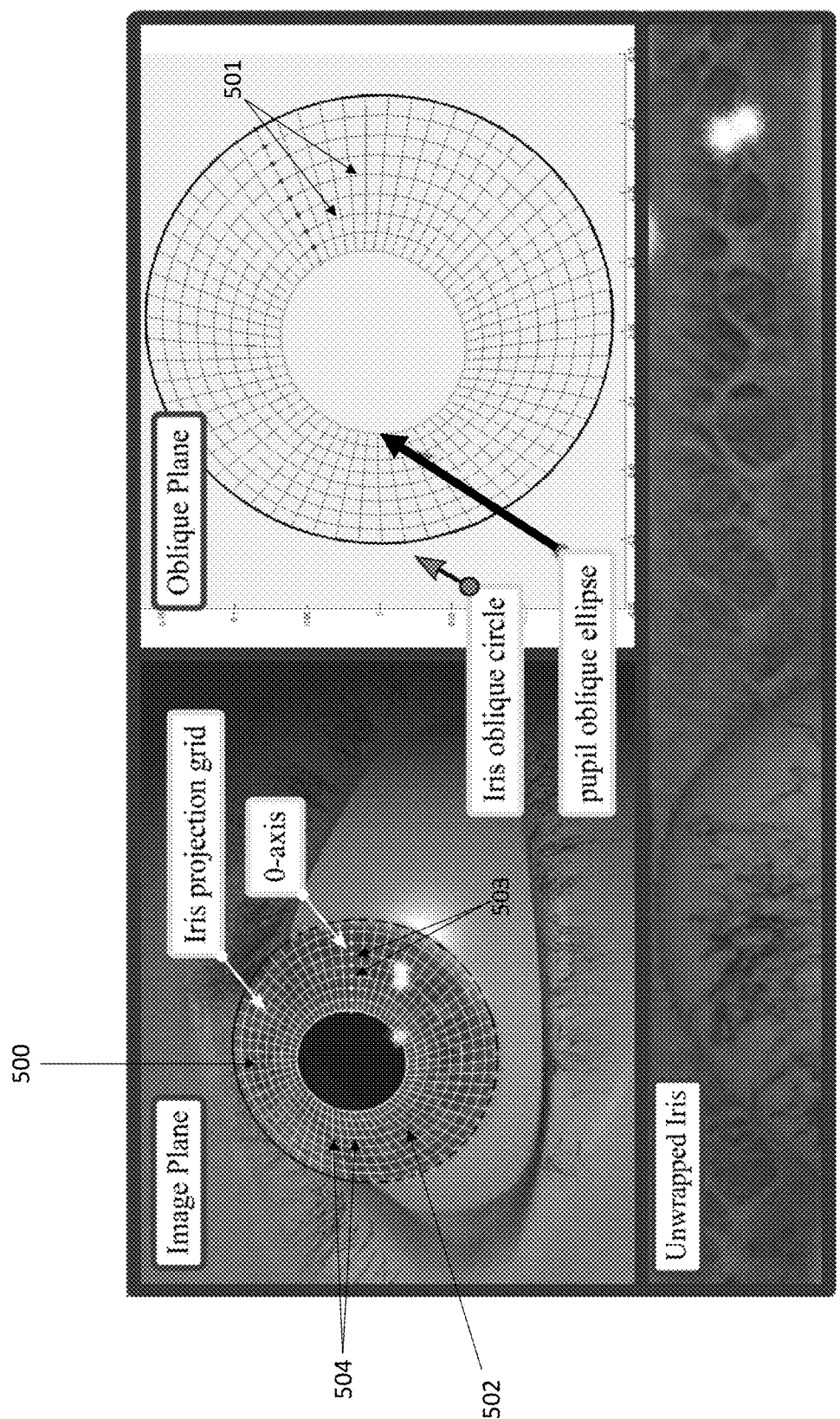
FIG. 14 illustrates: in the right-upper part, an iris grid generated in the oblique iris plane according to the execution of the method of FIG. 11: in the left-upper part, the grid transformed into the image space and overlapped to a corresponding iris region; and in the lower part, the iris region unwrapped.

The curves corresponding to $\hat{Q}_i$ and $\hat{Q}_p$ are illustrated in the common oblique iris plane in the upper right portion of FIG. 14. As expected, by applying the rotation matrix $\hat{W}$, the ellipse fitting the iris boundary in camera coordinates is transformed into a circle within the oblique iris plane.

In absence of cornea distortion, the ellipse fitting the pupil boundary should have eccentricity and centre corresponding to the eccentricity and centre of the ellipse fitting the iris boundary. As such, the ellipse fitting the pupil boundary in camera coordinates would be transformed by the rotation matrix $\hat{W}$ into a circle concentric to the oblique iris circle. Instead, due to cornea refraction, the ellipse fitting the pupil boundary in camera coordinates is transformed by the rotation matrix $\hat{W}$ into an ellipse within the oblique iris plane that is slightly elliptical (i.e. having a slight, but not null eccentricity), and with a centre that is slightly separated from the centre of the iris circle. As such, an eye's gaze vector estimated from the obtained oblique pupil ellipse will be slightly different than the gaze vector $\vec{g}$ estimated from the oblique iris circle, due to the refractive index of the cornea. The disparity in shape and centring between the pupil ellipse and iris circle are advantageously used to generate, within the common oblique plane, ellipses 501 for an iris projection grid 500 that can effectively model the distortion caused by cornea refraction (method step 410).

As illustrated in the upper-right part of FIG. 14, the intermediate region between the pupil ellipse and iris circle is filled with m grid ellipses 401 described by corresponding ellipse matrices $\hat{Q}_a$, where a=1, 2, ..., m, and the first and last ellipses are respectively the pupil ellipse ($\hat{Q}_1 = \hat{Q}_p$) and the iris circle ($\hat{Q}_m = \hat{Q}_i$) (considered as an ellipse with null eccentricity).

The centres and eccentricity of the ellipses $\hat{Q}_a$ are interpolated between the pupil ellipse and iris circle. For example, the centres of the ellipses 501 change linearly from the centre of the pupil ellipse and the centre of the iris circle, and the minor axis length and eccentricity of the ellipses 501 changes linearly from the pupil ellipse to the iris circle. Each ellipse 501 has the same orientation angle as the oblique pupil ellipse.

The grid ellipses 501 generated in the oblique iris plane are then transformed into image spatial coordinates using the rotation matrix $\hat{W}$ and the intrinsic camera matrix $\hat{K}$ (method step 411). In particular, each of the grid ellipse matrixes $\hat{Q}_a$ is transformed into a corresponding grid ellipse matrix $\hat{M}_a$ in image spatial coordinates according to:

$$\hat{M}_a \hat{K}^{-T} \hat{W} \hat{Q}_a \hat{W}^T \hat{K}^{-1}$$

where again the transformed grid ellipse matrices $\hat{M}_a$ are normalized to homogeneous coordinates in such a way as to have a final matrix element equal to −1 according to the form:

$$\begin{pmatrix} A & B & D \\ B & C & E \\ D & E & -1 \end{pmatrix}$$

Then, a 0-axis is selected for unwrapping the iris region in order to extract an iris texture. The 0-axis can be a line with known slope and constant, e.g. the horizontal line extending from the pupil centre as illustrated in FIG. 14.

Before extracting the iris texture, the grid ellipses 501 are preferably corrected to present grid points for extracting the iris textures disposed consistently relative to the selected 0-axis (method step 412).

According to an exemplary embodiment, the centre ($x_0$, $y_0$), minor and major axes a, b, and angle of inclination $\vartheta$ of each grid ellipse transformed into the image space is extracted from the respective matrix $\hat{M}_a$, and these parameters are used to calculate, for each grid ellipse, corresponding translation and rotation matrixes $\hat{T}$, $\hat{R}$ according to:

$$\hat{T} = \begin{pmatrix} 1 & 0 & -x_0 \\ 0 & 1 & -y_0 \\ 0 & 0 & 1 \end{pmatrix} \quad \hat{R} = \begin{pmatrix} \cos(\theta) & \sin(\theta) & 0 \\ -\sin(\theta) & \cos(\theta) & 0 \\ 0 & 0 & 1 \end{pmatrix}$$

The calculated translation and rotation matrixes $\vec{\hat{T}}$, $\vec{R}$ are used to centre the grid ellipses into the origin (0,0) of the image plane, in such a way as the origin-centred ellipse are non-oblique relative to the origin X axis (i.e. the major axes a of the ellipses lays on the origin X-axis).

Intersection points $\hat{q}_j$ are also determined in the image space between the selected 0-axis and the grid ellipses defined by the matrices $\hat{M}_a$. In particular, the intersection points are represented in the image spatial coordinates as:

$$\hat{q}_j = (x_j, y_j, 1)^T$$

The intersection points undergo the transformation centering the respective grid into the origin of the image plane, according to:

$$q'_j = \hat{R}_j^T \hat{T}_j^T \hat{q}_j$$

and a correction angle $\varphi_j$ can be calculated for each transformed intersection point $\hat{q}'_j$ according to:

$$\varphi_j = \cos^{-1}\left(\frac{x_j}{a_j}\right)$$

where $a_j$ is the major axis of the grid ellipse of the intersection point $\hat{q}'_j$.

A plurality of n grid points can be radially defined along each of the m origin-centred non-oblique grid ellipses, taking into account the calculated correction angle $\varphi_j$.

In particular, the grid points can be expressed as:

$$\hat{p}_j = (x_j, y_j, 1)^T$$

where the coordinates $x_j$, $y_j$ of the grid points along a given origin-centred grid ellipse are calculated according to:

$$x_j = a_j \cos(\vartheta - \varphi_j) y_j = b_j \sin(\vartheta - \varphi_j)$$

where $a_j$, $b_j$ are the major and minor axes of the given grid ellipse, and $\vartheta$ is an angle varying between 0 and $2\pi$ according to the radial position of each grid point along the given origin-centred grid-ellipse. For example, the obtained grid can be of dimension 512 (m)×72 (n) points.

The obtained grid points are then moved back to the imaged iris region by applying the reverse transformation that centred the grid ellipses into the origin of the image plane, according to:

$$\hat{p}'_j = \hat{R}_j \hat{T}_j \hat{p}_j$$

where $\hat{p}_j = (x_j, y_j, 1)^T$ and $$\hat{T} = \begin{pmatrix} 1 & 0 & x_0 \\ 0 & 1 & y_0 \\ 0 & 0 & 1 \end{pmatrix}$$

An example of resulting grid 500 including n×m grid points 504 is illustrated in the left-upper part of FIG. 14, where it can be appreciated how, due to the applied correction angle $\varphi_j$, corresponding starting grid points 503 ($\vartheta=0$) on the n ellipses 501 are all lying on the selected unwrapping 0-axis.

A clockwise (or counter-clockwise) unwrap of the iris region and overlapped grid 501 is then forced around the 0-axis. The unwrapped iris region is illustrated for example in the lower part of FIG. 14.

Then, groups of image pixels are identified, using pixel indexing, that correspond to each one of the m×n grid points 504. In practice, for a given grid point 504, a pixel group comprising a given pixel including the image spatial coordinates of the given grid point and at least one other adjacent pixel can be identified. For example, a group of 4×4 adjacent image pixels can be identified for each grid point.

The values of the adjacent pixels identified for each grid point are then read and interpolated, using e.g. a bilinear interpolation or any other similar technique, to generate an iris texture including m×n points (method step 413).

The extracted iris texture is then included in a corresponding iris template and securely stored in the system 10, e.g. in the memory or into the BAU 20, for later comparison by the BAU to the enrolment iris templates stored for user's recognition/authentication.

Before being used for the comparison, the BAU 20 or other dedicated unit of the system 10 can apply image post processing to improve the quality of the iris texture, e.g. by removing texture regions that contain eyelids or other periocular portions.

It will be appreciated that, due to the application of the correction angle $\varphi_j$ in generating the grid points 504, radially corresponding grid points 504 on the n ellipses 501 are consistently positioned relative to the 0-axis, thus improving the consistency of iris texture extraction from the unwrapped iris image and facilitating a comparison between iris texture extracted by selecting different unwrapping axes.

It is to be appreciated that alternatively to the implementation disclosed above, the grid points 504 can be generated directly into the iris oblique plane and then transformed in the image space to be positioned onto the imaged iris region.

It is to be further appreciated that the above disclosed method 400 can be equally performed by: determining an oblique rotation matrix $\hat{W}$ for transforming an oblique elliptical pupil cone into an oblique circular pupil cone; transforming, using this matrix $\hat{W}$, the ellipses fitting the iris and pupil boundaries in camera coordinates into a common oblique pupil plane; and generate the iris projection grid in the common oblique pupil plane, between the obtained pupil circle and iris ellipse (having eccentricity not null due to the cornea refraction).

The pupil is easier to segment than the iris, since at the iris edge there could be present eyelids, other periocular regions or shadows. Thus, a more accurate ellipse fitting can be produced for the pupil than the iris. Furthermore, the iris texture is more "feature rich" around the pupil edge, as compared to the iris edge, On the other hand, the ocular region around the iris-sclera boundary region is less effected by distortion due to cornea refraction than the ocular regions around the pupil-iris boundary.

To summarize, it will be appreciated that starting from adequate segmentation iris and pupil points and knowing the intrinsic camera matrix $\hat{K}$, the method 400 relies on a single rectilinear image and the relative differences between the ellipses fitted to the iris and pupil boundaries due to cornea refraction, to generate an iris projection grid that linearly approximates the iris texture distortion due to cornea refraction. In this way, the grid points are better positioned onto relevant iris points in the image plane.

Nevertheless, it will be further appreciated that the same operations that have been disclosed to be performed in the camera space (working in camera coordinates) during the execution of method 400 can be performed as well by staying in the image space (working in image space coordinates).

The invention claimed is:

1. A method comprising:
acquiring, through an image sensor, an image including an iris of an eye of a subject;
determining a set of first points defining an iris-pupil boundary in the image;
determining a set of second points defining an iris-sclera boundary in the image;
determining a first ellipse fitting the set of first points;
determining a second ellipse fitting the set of second points;
transforming a selected one of the first ellipse or the second ellipse into a circle on a plane;
transforming a non-selected one of the first ellipse or the second ellipse into a transformed ellipse on the plane;
interpolating a plurality of ellipses between (i) the circle and (ii) the transformed ellipse to provide grid ellipses;
moving the grid ellipses onto the iris in the image using an inverse transformation of a transformation related to transforming the first ellipse and the second ellipse into the circle and the transformed ellipse; and
unwrapping the iris and interpolating image pixel values at individual grid points defined along the grid ellipses to extract an iris texture.

2. The method of claim 1, further comprising:
transforming spatial image coordinates of the first points and the second points into camera coordinates using a matrix of camera intrinsic parameters,
wherein moving the grid ellipses onto the iris within the image comprises moving the grid ellipses onto the iris within the image using (i) the inverse transformation and (ii) the matrix of camera intrinsic parameters.

3. The method of claim 2, wherein the matrix of camera intrinsic parameters is obtained by a calibration process to determine correction parameters for compensating image distortions introduced by a camera module.

4. The method of claim 1, wherein after transforming into the circle and the transformed ellipse, the first points and second points are expressed in homogeneous camera coordinates.

5. The method of claim 1, further comprising:
determining a transformation related to transforming the first ellipse and the second ellipse into the circle and the transformed ellipse by determining a plurality of candidate transformations for transforming the selected one of the first ellipse or the second ellipse into a circle; and
selecting the candidate transformation which is consistent with a gaze vector of the eye by comparing gaze vectors estimated using the candidate transformations with an estimated center of the eye in the image.

6. The method of claim 1, further comprising:
determining a transformation related to transforming the first ellipse and the second ellipse into the circle and the transformed ellipse by determining a rotation for transforming an oblique elliptical cone having the selected one of the first ellipse or the second ellipse as a base and a vertex at a focal point of a camera into an oblique circular cone having a circular base and a vertex at the focal point of the camera, wherein an inverse rotation of a normal vector to the circular base of the oblique circular cone corresponds to a gaze vector of the eye.

7. The method of claim 6, wherein determining the rotation comprises:
applying a first rotation to transform the oblique elliptical cone to a non-oblique elliptical cone; and
applying a second rotation to transform the non-oblique elliptical cone to the oblique circular cone.

8. The method of claim 6, further comprising:
transforming spatial image coordinates of the first points and the second points into camera coordinates using a matrix of camera intrinsic parameters,
wherein moving the grid ellipses onto the iris in the image comprises moving the grid ellipses onto the iris in the image using an inverse rotation of (i) the rotation and (ii) the matrix of camera intrinsic parameters.

9. The method of claim 1, wherein:
centers of the grid ellipses change linearly between the centers of (i) the circle and (ii) the transformed ellipse;
minor axes and eccentricity of the grid ellipses change linearly between (i) the circle and (ii) the transformed ellipse; and
inclination angles of the grid ellipses correspond to an inclination angle of the transformed ellipse.

10. The method of claim 1, further comprising:
selecting an image axis for unwrapping the iris; and
generating a plurality of grid points along each grid ellipse moved onto the iris in the image such that corresponding starting grid points along the grid ellipses lay on the image axis.

11. An image acquisition system configured to:
acquire, through an image sensor, an image including an iris of an eye of a subject;
determine a set of first points defining an iris-pupil boundary in the image;
determine a set of second points defining an iris-sclera boundary in the image;
determine a first ellipse fitting the set of first points;
determine a second ellipse fitting the set of second points;
transform a selected one of the first ellipse or the second ellipse into a circle on a plane;
transform a non-selected one of the first ellipse or the second ellipse into a transformed ellipse on the plane;
interpolating a plurality of ellipses between (i) the circle and (ii) the transformed ellipse to provide grid ellipses;
move the grid ellipses onto the iris in the image using an inverse transformation of a transformation related to transforming the first ellipse and the second ellipse into the circle and the transformed ellipse; and
unwrapping the iris and interpolating image pixel values at individual grid points defined along the grid ellipses to extract an iris texture.

12. The image acquisition system of claim 11, wherein the image acquisition system is further configured to:
transform spatial image coordinates of the first points and the second points into camera coordinates using a matrix of camera intrinsic parameters; and
move the grid ellipses onto the iris within the image using (i) the inverse transformation and (ii) the matrix of camera intrinsic parameters.

13. The image acquisition system of claim 12, wherein the matrix of camera intrinsic parameters is obtained by a calibration process to determine correction parameters for compensating image distortions introduced by a camera module.

14. The image acquisition system of claim 11, wherein after transforming into the circle and the transformed ellipse, the first points and second points are expressed in homogeneous camera coordinates.

15. The image acquisition system of claim 11, wherein the image acquisition system is further configured to:
determine a transformation related to transforming the first ellipse and the second ellipse into the circle and the transformed ellipse by determining a plurality of candidate transformations for transforming the selected one of the first ellipse or the second ellipse into a circle; and
select the candidate transformation which is consistent with a gaze vector of the eye by comparing gaze vectors estimated using the candidate transformations with an estimated center of the eye in the image.

16. The image acquisition system of claim 11, wherein the image acquisition system is further configured to determine a transformation related to transforming the first ellipse and the second ellipse into the circle and the transformed ellipse by:
determining a rotation for transforming an oblique elliptical cone having the selected one of the first ellipse or the second ellipse as a base and a vertex at a focal point of a camera into an oblique circular cone having a circular base and a vertex at the focal point of the camera, wherein an inverse rotation of a normal vector to the circular base of the oblique circular cone corresponds to a gaze vector of the eye.

17. The image acquisition system of claim 16 wherein the image acquisition system is further configured to determine the rotation by:
applying a first rotation to transform the oblique elliptical cone to a non-oblique elliptical cone; and
applying a second rotation to transform the non-oblique elliptical cone to the oblique circular cone.

18. The image acquisition system of claim 16, wherein the image acquisition system is further configured to:
transform spatial image coordinates of the first points and the second points into camera coordinates using a matrix of camera intrinsic parameters; and
move the grid ellipses onto the iris in the image using an inverse rotation of (i) the rotation and (ii) the matrix of camera intrinsic parameters.

19. The image acquisition system of claim 11, wherein:
centers of the grid ellipses change linearly between the centers of (i) the circle and (ii) the transformed ellipse;

minor axes and eccentricity of the grid ellipses change linearly between (i) the circle and (ii) the transformed ellipse; and inclination angles of the grid ellipses correspond to an inclination angle of the transformed ellipse.

20. The image acquisition system of claim 11, wherein the image acquisition system is further configured to:

select an image axis for unwrapping the iris; and generate a plurality of grid points along each grid ellipse moved onto the iris in the image such that corresponding starting grid points along the grid ellipses lay on the image axis.

\* \* \* \* \*